(12) United States Patent
Kuzuhara et al.

(10) Patent No.: US 12,196,959 B2
(45) Date of Patent: *Jan. 14, 2025

(54) HEAD-UP DISPLAY AND MOVING BODY WITH HEAD-UP DISPLAY MOUNTED THEREON

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/503,780

(22) Filed: Nov. 7, 2023

(65) Prior Publication Data

US 2024/0077721 A1 Mar. 7, 2024

Related U.S. Application Data

(63) Continuation of application No. 18/095,313, filed on Jan. 10, 2023, now Pat. No. 11,852,809, which is a
(Continued)

(30) Foreign Application Priority Data

Dec. 11, 2017 (JP) .................... 2017-236946

(51) Int. Cl.
*G02B 27/01* (2006.01)
*B60R 11/02* (2006.01)
*B60R 11/00* (2006.01)

(52) U.S. Cl.
CPC ...... *G02B 27/0101* (2013.01); *B60R 11/0229* (2013.01); *B60R 2011/0026* (2013.01);
(Continued)

(58) Field of Classification Search
None
See application file for complete search history.

(56) References Cited

U.S. PATENT DOCUMENTS

| 4,669,810 A | 6/1987 | Wood |
| 4,763,990 A | 8/1988 | Wood |

(Continued)

FOREIGN PATENT DOCUMENTS

| EP | 660155 A1 | 6/1995 |
| JP | 60-198515 | 10/1985 |

(Continued)

OTHER PUBLICATIONS

International Search Report of PCT application No. PCT/JP2018/039307 dated Nov. 27, 2018.
(Continued)

*Primary Examiner* — Fred Tzeng
(74) *Attorney, Agent, or Firm* — Rimon P.C.

(57) ABSTRACT

A head-up display is configured to project an image on a transparent reflection member to cause an observer to visually recognize a virtual image, and includes a display device configured to display the image, and a projection optical system configured to project the image displayed by the display device as the virtual image for the observer. The projection optical system is configured to form an image as an intermediate image, and includes a first lens configured to condense light, and a first optical element configured to diffuse light. The first lens and the first optical element are disposed in this order along an optical path from the display device. The first lens is inclined with respect to a reference beam which is defined as a beam reaching a center of a viewpoint region of the observer and corresponding to a center of the virtual image.

13 Claims, 9 Drawing Sheets

Related U.S. Application Data continuation of application No. 16/892,397, filed on Jun. 4, 2020, now Pat. No. 11,579,445, which is a continuation of application No. PCT/JP2018/039307, filed on Oct. 23, 2018.

(52) U.S. Cl.
CPC .................. B60R 2300/205 (2013.01); G02B 2027/0183 (2013.01); G02B 2027/0187 (2013.01)

(56) References Cited

U.S. PATENT DOCUMENTS

| | | | |
|---|---|---|---|
| 5,357,372 | A | 10/1994 | Chen et al. |
| 7,733,572 | B1 | 6/2010 | Brown et al. |
| 8,277,049 | B2 | 10/2012 | Fang et al. |
| 9,835,858 | B2 | 12/2017 | Nambara |
| 10,923,003 | B2 | 2/2021 | Kusafuka et al. |
| 11,221,481 | B2 | 1/2022 | Kusafuka et al. |
| 11,852,809 | B2 * | 12/2023 | Kuzuhara ............... B60K 35/23 |
| 2005/0052617 | A1 | 3/2005 | Fujikawa et al. |
| 2005/0219847 | A1 | 10/2005 | Ikeda et al. |
| 2006/0152822 | A1 | 7/2006 | Imaoka et al. |
| 2010/0225833 | A1 | 9/2010 | Methe et al. |
| 2011/0199575 | A1 | 8/2011 | Buchheister et al. |
| 2012/0081800 | A1 | 4/2012 | Cheng et al. |
| 2013/0063754 | A1 | 3/2013 | Saisho et al. |
| 2014/0085615 | A1 | 3/2014 | Pretorius et al. |
| 2015/0062697 | A1 | 3/2015 | Komatsu et al. |
| 2015/0192775 | A1 | 7/2015 | Suzuki |
| 2015/0277129 | A1 | 10/2015 | Hua et al. |
| 2015/0286053 | A1 | 10/2015 | Hu |
| 2016/0004081 | A1 | 1/2016 | Kasahara et al. |
| 2016/0139408 | A1 | 5/2016 | Yagi |
| 2016/0243942 | A1 | 8/2016 | Sato et al. |
| 2017/0184843 | A1 * | 6/2017 | Kuzuhara ............ G02B 17/008 |
| 2018/0017790 | A1 | 1/2018 | Kuzuhara et al. |
| 2018/0039077 | A1 | 2/2018 | Kuzuhara et al. |
| 2018/0259770 | A1 * | 9/2018 | Kuzuhara ............ G03B 21/142 |
| 2018/0259771 | A1 * | 9/2018 | Kuzuhara ............ G03B 21/28 |
| 2018/0329212 | A1 | 11/2018 | Aiki |
| 2018/0348515 | A1 * | 12/2018 | Kuzuhara ............. B60K 35/00 |
| 2018/0356638 | A1 | 12/2018 | Yang et al. |
| 2019/0293939 | A1 | 9/2019 | Sluka |
| 2020/0301140 | A1 * | 9/2020 | Kuzuhara .......... G02B 17/0848 |
| 2022/0326520 | A1 * | 10/2022 | Kuzuhara .......... G02B 17/0816 |

FOREIGN PATENT DOCUMENTS

| | | |
|---|---|---|
| JP | 6-027407 | 2/1994 |
| JP | 2005-205974 | 8/2005 |
| JP | 2008-180759 | 8/2008 |
| JP | 2011-209732 | 10/2011 |
| JP | 2013-127489 | 6/2013 |
| JP | 2015-072435 | 4/2015 |
| JP | 2017-120388 | 7/2017 |
| JP | 2017-215413 A | 12/2017 |
| WO | 2014/024403 | 2/2014 |
| WO | 2016/208195 | 12/2016 |
| WO | 2016/208196 | 12/2016 |

OTHER PUBLICATIONS

International Search Report of PCT Application No. PCT/JP2018/039306 dated Nov. 27, 2018.
Extended European Search Report dated Dec. 2, 2020 for the related European Patent Application No. 18888329.2.
Non-Final Office Action dated Feb. 17, 2022 issued in U.S. Appl. No. 16/892,397.
Non-Final Office Action dated Aug. 1, 2022 issued in U.S. Appl. No. 16/892,397.
Notice of Allowance dated Oct. 28, 2022 issued in U.S. Appl. No. 16/892,397.
Non-Final Office Action dated May 25, 2023 issued in U.S. Appl. No. 18/095,313.
Notice of Allowance dated Oct. 8, 2023 issued in U.S. Appl. No. 18/095,313.

* cited by examiner

HEAD-UP DISPLAY AND MOVING BODY WITH HEAD-UP DISPLAY MOUNTED THEREON

CROSS-REFERENCE TO RELATED APPLICATIONS

This application is a Continuation of U.S. patent application Ser. No. 18/095,313, filed on Jan. 10, 2023, now U.S. Pat. No. 11,852,809 which in turn is a Continuation of U.S. patent application Ser. No. 16/892,397, filed on Jun. 4, 2020, now U.S. Pat. No. 11,579,445, issued on Feb. 14, 2023, which in turn is a Continuation of International Patent Application No. PCT/JP2018/039307, filed on Oct. 23, 2018, which claims the benefit of foreign priority of Japanese Patent Application No. 2017-236946 filed on Dec. 11, 2017, the contents all of which are incorporated herein by reference.

TECHNICAL FIELD

The present disclosure relates to a head-up display and a moving body with the head-up display mounted thereon.

BACKGROUND ART

PTL 1 discloses a head-up display configured to project a displayed image on a windshield. The head-up display has a display surface, and includes a display device configured to display an image on the display surface, a concave mirror, and a lens disposed between the concave mirror and the display surface and configured to condense light. The head-up display further includes a first optical system configured to form an image from beams emitted from the display surface and passing the lens and the concave mirror to form an intermediate image obtained by enlarging the image. The head-up display still further includes a second optical system configured to project the intermediate image on the windshield. The intermediate image formed by the first optical system is larger than the image displayed on the display surface by the display device. This configuration achieves reduction in size of the first optical system and the second optical system.

CITATION LIST

Patent Literature

PTL 1: Unexamined Japanese Patent Publication No. 2017-120388

SUMMARY

The present disclosure provides a head-up display that can be reduced in size and effectively inhibits stray light caused by outside light.

The present disclosure provides a head-up display configured to project an image on a transparent reflection member to cause an observer to visually recognize a virtual image, the head-up display including: a display device configured to display the image; and a projection optical system configured to project the image displayed by the display device as the virtual image for the observer. The projection optical system is configured to form the image as an intermediate image, and includes a first lens configured to condense light, and a first optical element configured to diffuse light. The first lens and the first optical element are disposed in this order along an optical path from the display device. The first lens is inclined with respect to a reference beam which is defined as a beam reaching a center of a viewpoint region of the observer and corresponding to a center of the virtual image.

The head-up display according to the present disclosure is configured to provide a less distorted virtual image, can be reduced in size, and effectively inhibit stray light caused by outside light.

DESCRIPTION OF EMBODIMENTS

Exemplary embodiments will hereinafter be described with appropriate reference to the drawings. The description may not include details beyond necessity. For example, already well-known matters may not be described in detail, and substantially identical configurations may not be described repeatedly. These prevent unnecessary redundancy in the following description and lead to easier comprehension by the person skilled in the art.

The inventor(s) provide the accompanying drawings and the following description for full comprehension of the present disclosure by the person skilled in the art, without any intention to limit the subject matter recited in the claims.

First Exemplary Embodiment

The first exemplary embodiment will be described below with reference to FIG. 1 to FIG. 4.
[1-1. Configuration]
[1-1-1. Entire Configuration of Head-Up Display]

Head-up display 100 according to a specific exemplary embodiment and a practical example of the present disclosure will be described hereinafter with reference to the drawings.

Figure 1:
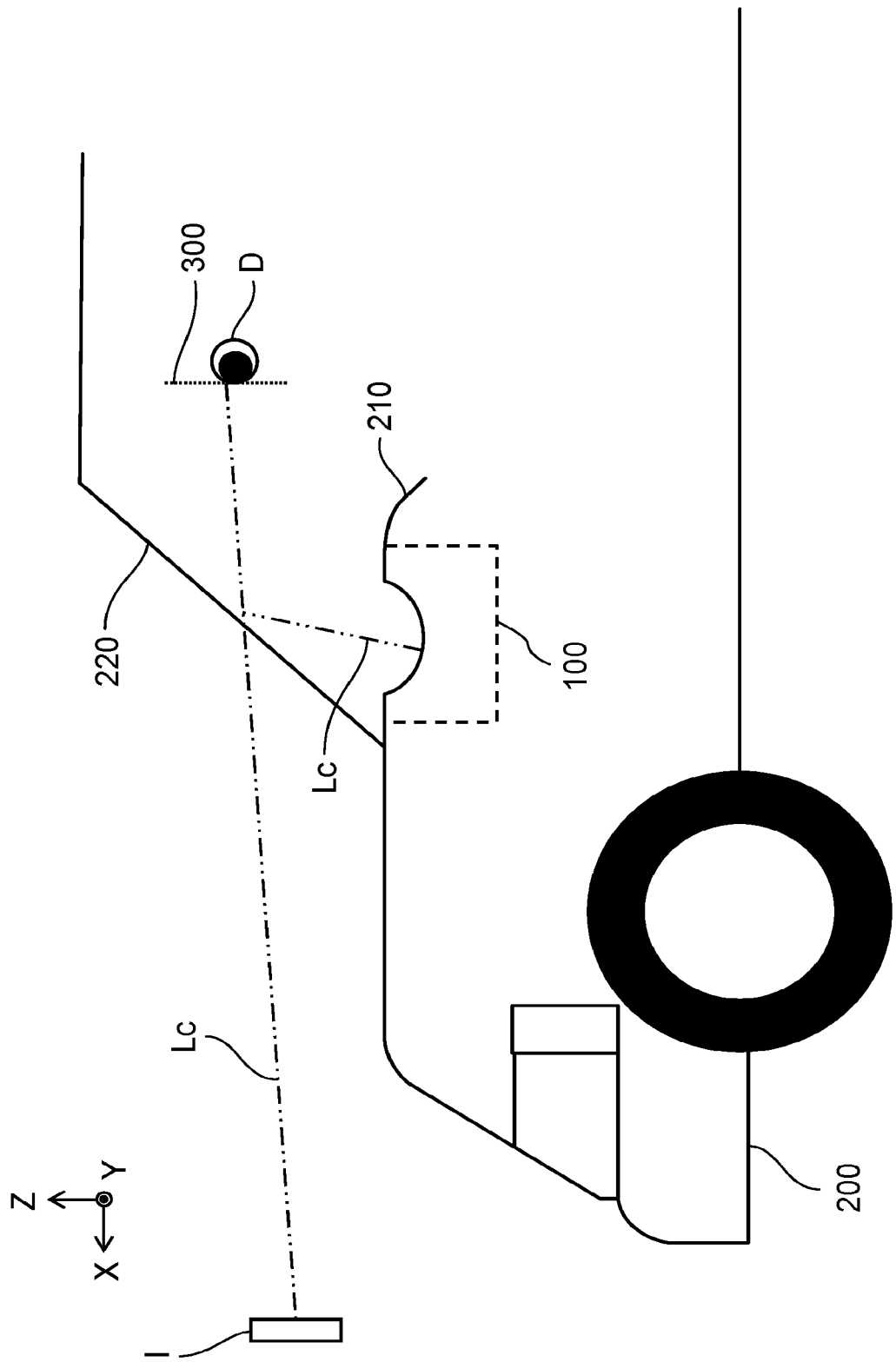
FIG. 1 is an explanatory schematic view of a vehicle equipped with a head-up display according to a first exemplary embodiment.

FIG. 1 is a sectional view of vehicle 200 equipped with head-up display 100 according to the present disclosure. As depicted in FIG. 1, head-up display 100 is disposed in dashboard 210 below windshield 220 of vehicle 200.

Observer D recognizes an image projected from head-up display 100 as virtual image I.

Figure 2:
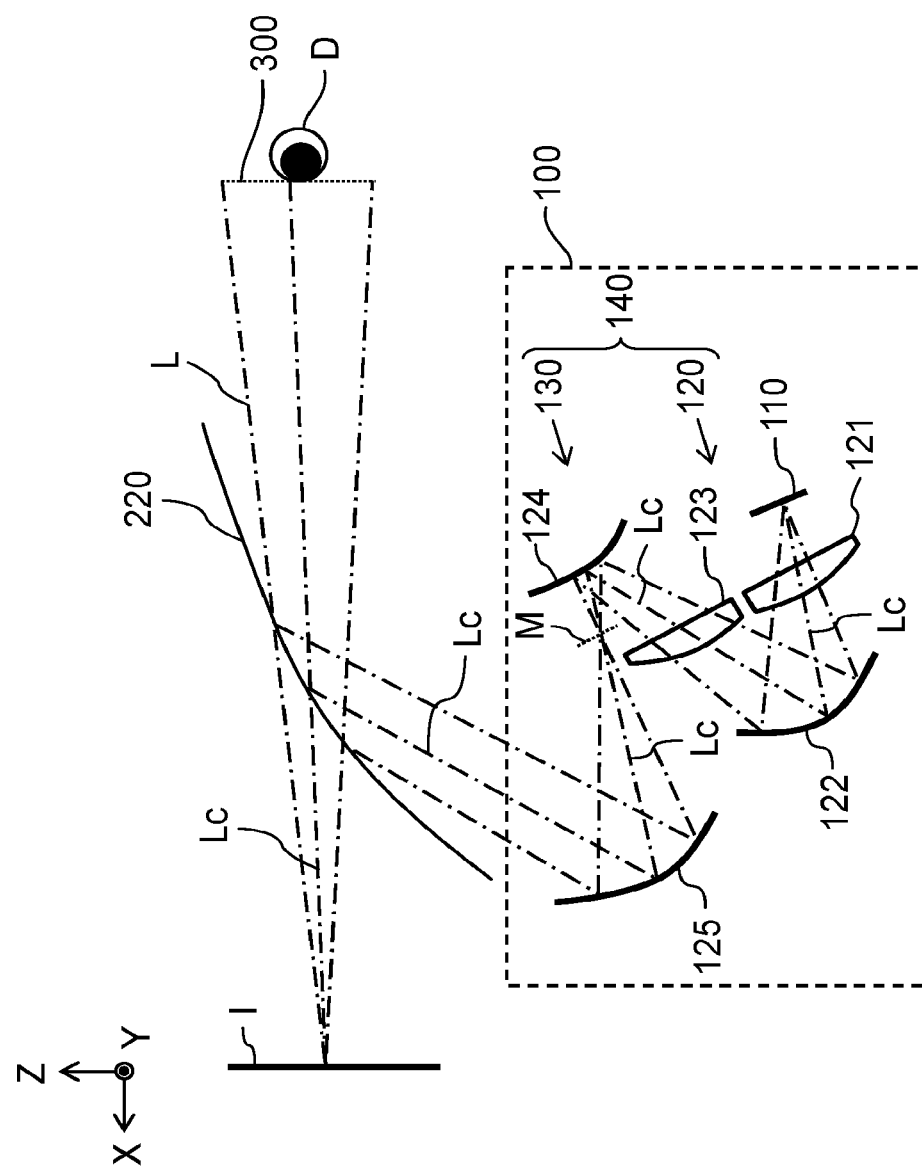
FIG. 2 is a schematic view depicting a configuration of the head-up display according to the first exemplary embodiment.
Figure 3:
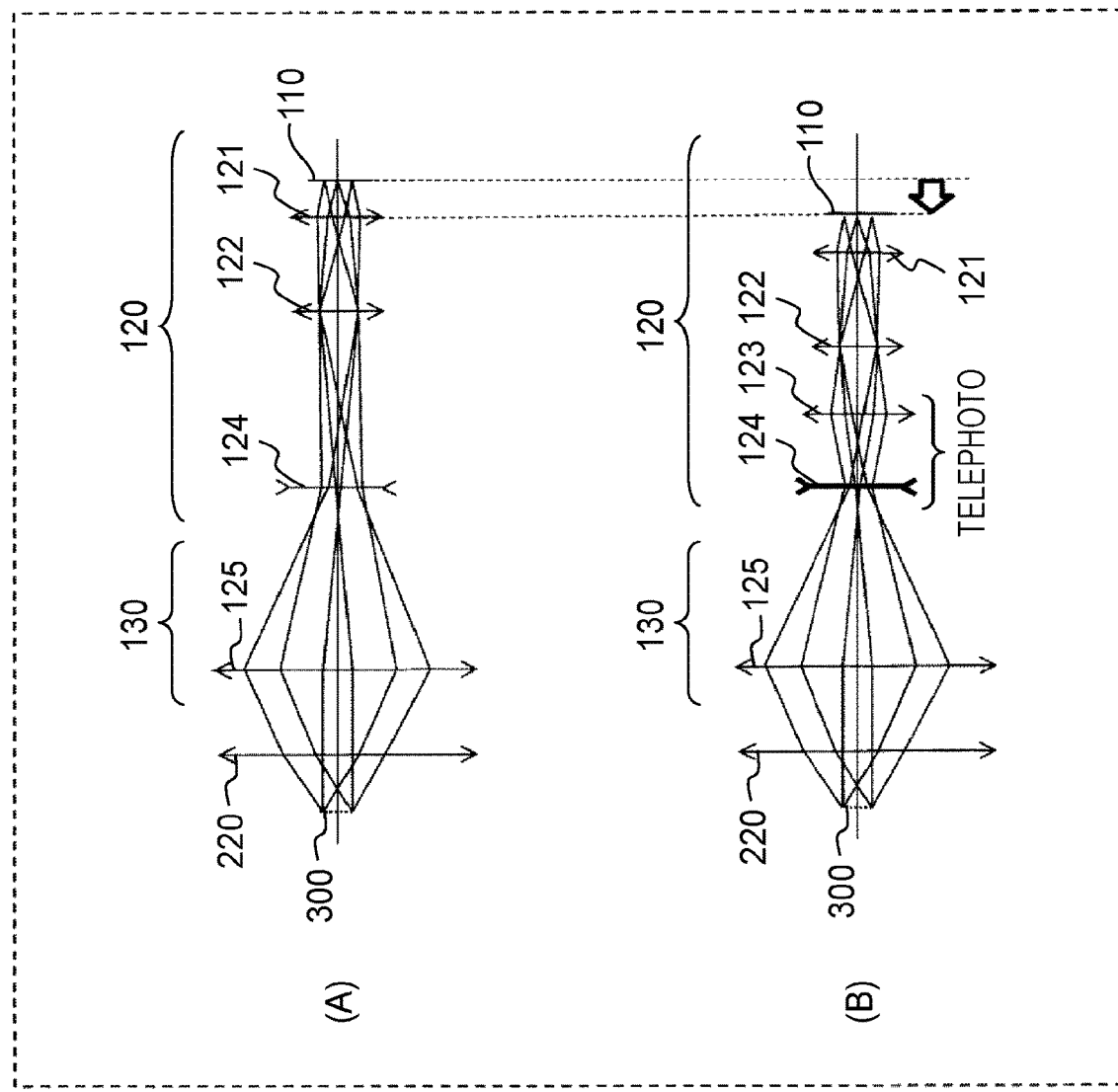
FIG. 3 is an explanatory schematic view depicting telephoto arrangement according to the first exemplary embodiment.

FIG. 2 is a schematic view depicting a configuration of head-up display 100 according to the present exemplary embodiment. FIG. 3 is an explanatory schematic view depicting the configuration of head-up display 100 according to the present exemplary embodiment.

As depicted in FIG. 2, head-up display 100 includes display device 110 and projection optical system 140. Head-up display 100 projects an image displayed by display device 110 on windshield 220. Projected light is reflected by windshield 220 and is guided into viewpoint region 300 of observer D. Head-up display 100 accordingly causes observer D to visually recognize virtual image I. A viewpoint corresponds to a principal point of an eye of observer D considered as a lens. Viewpoint region 300 corresponds to a region including the viewpoint of observer D, and enables observer D to visually recognize entire virtual image I.

The present disclosure refers to a forward direction indicating a direction from observer D to windshield 220 of vehicle 200. A backward direction indicates a direction opposite to the forward direction. A downward direction indicates a direction toward a ground surface on which vehicle 200 travels. An upward direction indicates a direction opposite to the downward direction. An inward direction indicates a direction from observer D on a driver's seat to a passenger seat. An outward direction indicates a direction opposite to the inward direction. Viewpoint region 300 corresponds to a region enabling observer D to visually recognize entire virtual image I.

As depicted in FIG. 2, it is assumed that beams emitted from display device 110 include beam L reaching viewpoint region 300. The beams emitted from display device 110 also include reference beam Lc passing a center of virtual image I and reaching a center of viewpoint region 300. When viewed from observer D, reference beam Lc corresponds to an optical path from the center of virtual image I to the viewpoint of observer D. Reference beam Lc visually recognized by observer D actually is emitted from display device 110 and reaches observer D via the optical system. A beam corresponding to reference beam Lc emitted from the center of virtual image I and running from display device 110 to observer D is also called reference beam Lc. Optical paths corresponding to these beams are also called reference beam Lc. It is assumed that the viewpoint of observer D is positioned at the center of viewpoint region 300.

Display device 110 displays an image on a diffusing surface or the like under control of a controller such as a CPU (not depicted). Examples of display device 110 include a liquid crystal display equipped with a backlight unit, an organic light-emitting diode, and a plasma display. Display device 110 may alternatively be constituted by a screen configured to diffuse or reflect light, and a projector or a scanning laser to generate an image. Display device 110 is configured to display various information such as a road travel guide, distance to a vehicle travelling ahead, vehicle battery residual quantity, and current vehicle speed. Display device 110 may optionally be configured to electronically distort an image preliminarily in accordance with distortion generated by projection optical system 130 or windshield 220 and a position of observer D acquired by a camera (not depicted). This configuration enables preferred visual recognition of virtual image I by observer D. Display device 110 may optionally be configured to preliminarily display pixels having a plurality of wavelengths displaced per display position in accordance with chromatic aberration generated by projection optical system 130. This configuration enables preferred visual recognition of virtual image I by observer D.

Projection optical system 140 includes relay optical system 120 and projection optical system 130. Relay optical system 120 includes second lens 121, first mirror 122 serving as a second optical element, first lens 123, and second mirror 124 serving as a first optical element. Relay optical system 120 forms an image from beams emitted from display device 110 to form intermediate image M obtained by enlarging the image thus displayed. Intermediate image M is formed by enlarging the image displayed on the screen of display device 110. Intermediate image M can thus have a large size even if the image displayed on the screen of display device 110 has a small size. This achieves reduction in size of the screen of display device 110. Intermediate image M having such a large size leads to magnification decrease in projection optical system 130. This enables decrease in positive power of third mirror 125 included in projection optical system 130 for inhibition of distortion on the screen.

Intermediate image M does not need to be formed at a position preferred for the intermediate image. Intermediate image M may have spherical aberration, comatic aberration, field curvature, and astigmatism.

Projection optical system 130 includes third mirror 125. Projection optical system 130 reflects, at third mirror 125, intermediate image M formed by relay optical system 120. Projection optical system 130 accordingly projects intermediate image M on windshield 220. Intermediate image M is an aerial image formed in a space, and is not formed on a projection surface causing diffusion and reflection. Third mirror 125 is disposed on an optical path from intermediate image M to windshield 220.

[1-1-2. Arrangement Configuration of Projection Optical System, Relay Optical System, and Display Device]

As depicted in FIG. 2, second lens 121 is positioned ahead of display device 110 in vehicle 200. As depicted in FIG. 2, second lens 121 is inclined counterclockwise from reference beam Lc in an XZ planar view of FIG. 2. This configuration prevents stray light caused by outside light entering a case and being reflected by a display surface of display device 110 or first mirror 122.

Second lens 121 is a free-form surface lens having difference between curvature in an X axis direction and curvature in a Y axis direction. Second lens 121 has a surface (incidence surface) adjacent to display device 110, and the surface is shaped to be planar toward display device 110 in the X axis direction and the Y axis direction. Second lens 121 has another surface (emission surface) adjacent to first mirror 122, and the surface is shaped to be convex toward first mirror 122 in the X axis direction and the Y axis direction.

First mirror 122 is positioned ahead of second lens 121 in vehicle 200. First mirror 122 condenses beams emitted from second lens 121 and reflects the beams toward first lens 123. First mirror 122 has a reflecting surface eccentric to reflect an image displayed by display device 110 toward second mirror 124. The reflecting surface of first mirror 122 is concave. Specifically, first mirror 122 expands light incident from second lens 121 to be projected on first lens 123. First mirror 122 is shaped to have a free-form surface. This shape enables strain correction of a virtual image caused by reflection.

As depicted in FIG. 2, first lens 123 is positioned behind first mirror 122 in vehicle 200. As depicted in FIG. 2, first lens 123 is inclined clockwise from reference beam Lc in the XZ planar view of FIG. 2. First lens 123 is inclined with respect to reference beam Lc at an exemplary angle from 15 degrees to 30 degrees. This configuration prevents stray light caused by outside light entering the case and being reflected by first mirror 122 or second mirror 124.

First lens 123 is a free-form surface lens having difference between curvature in the X axis direction and curvature in the Y axis direction. First lens 123 has a surface (incidence surface) adjacent to first mirror 122, and the incidence surface is shaped to be convex toward first mirror 122 in the X axis direction and the Y axis direction. First lens 123 has another surface (emission surface) adjacent to second mirror 124, and the emission surface is shaped to be planar toward display device 110 in the X axis direction and the Y axis direction.

Second mirror 124 is positioned behind first lens 123 in vehicle 200. Second mirror 124 diffuses beams emitted from first lens 123, and forms intermediate image M obtained by enlarging a display image at an optical path between second mirror 124 and third mirror 125. Second mirror 124 has a reflecting surface eccentric to enlarge the display image projected from first lens 123 and form intermediate image M at the optical path between second mirror 124 and third mirror 125. The reflecting surface of second mirror 124 is convex. Second mirror 124 is shaped to have a free-form surface. This shape enables strain correction of a virtual image caused by reflection.

Projection optical system 130 includes third mirror 125 serving as a third optical element. Third mirror 125 is positioned ahead of second mirror 124 in vehicle 200. Third mirror 125 condenses beams diffused by second mirror 124, and projects intermediate image M on windshield 220. Third mirror 125 has a reflecting surface eccentric to project intermediate image M on windshield 220. The reflecting surface of third mirror 125 is concave. Third mirror 125 is shaped to have a free-form surface. This shape enables strain correction of a virtual image caused by reflection.

In projection optical system 140 according to the present exemplary embodiment, first mirror 122, first lens 123 configured to condense light, and second mirror 124 serving as the first optical element configured to diffuse light and form intermediate image M are disposed in this order along an optical path from display device 110. First lens 123 and second mirror 124 configured to form intermediate image M are disposed in the order along the optical path, so that intermediate image M can be formed adjacent to an emission end of first lens 123. This leads to reduction in size of first lens 123 itself and reduction in size of head-up display 100.

In relay optical system 120 according to the present exemplary embodiment, first lens 123 having positive power and second mirror 124 having negative power are disposed after display device 110 and before intermediate image M. Relay optical system 120 has so-called telephoto arrangement. In such telephoto arrangement, first lens 123 increases negative power of second mirror 124 and second mirror 124 increases positive power of first lens 123. That is, first lens 123 and second mirror 124 improve power each other. This leads to reduction in entire length of relay optical system 120 and reduction in size of head-up display 100. FIG. 3 is an explanatory view indicating effect of telephoto arrangement.

FIG. 3 depicts relay optical system 120 and projection optical system 130 disposed linearly for easier comprehension. As apparent from FIG. 3, in comparison to part (A) of FIG. 3 according to a comparative example without provision of first lens 123, part (B) of FIG. 3 depicts relay optical system 120 having short entire length in the present exemplary embodiment with telephoto arrangement of first lens 123 and second mirror 124.

Beams forming intermediate image M are limited around second mirror 124 having negative power and configured to form intermediate image M. First lens 123 having positive power is disposed adjacent to second mirror 124 having negative power to achieve telephoto arrangement, which enables reduction in size of first lens 123 itself.

Figure 4:
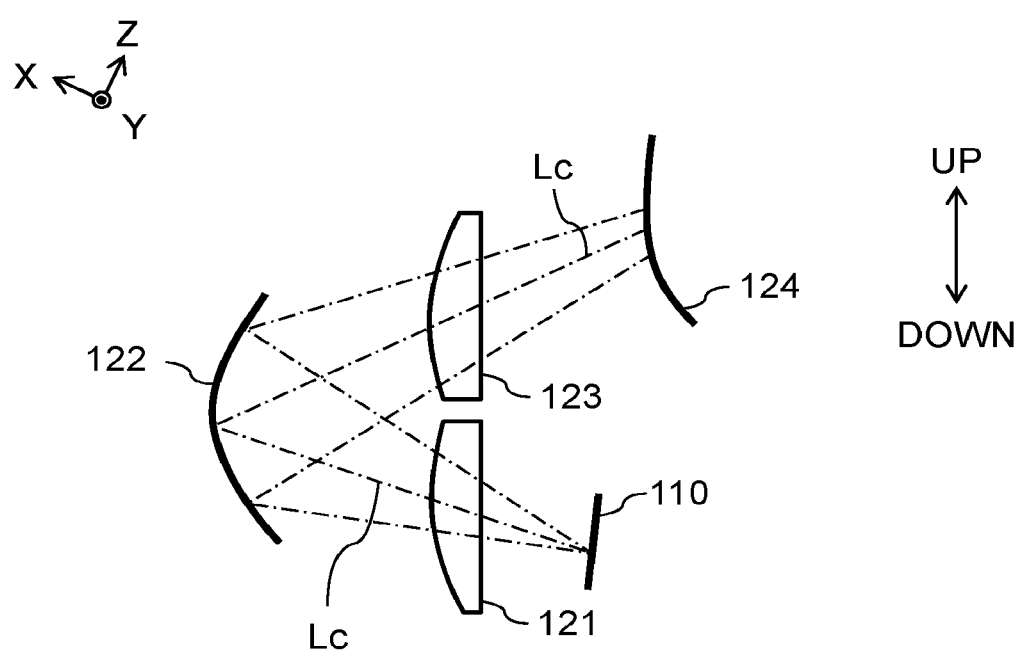
FIG. 4 is a schematic view depicting a configuration of a relay optical system according to the first exemplary embodiment.

As depicted in FIG. 4, the incidence surface and the emission surface of second lens 121 according to the present exemplary embodiment are inclined counterclockwise from reference beam Lc in the XZ planar view of FIG. 4. Furthermore, the incidence surface and the emission surface of first lens 123 are inclined clockwise from reference beam Lc in the XZ planar view of FIG. 4. Reflected light of outside light at first lens 123 is reflected to pass above first mirror 122, whereas reflected light of outside light at second lens 121 is reflected to pass below first mirror 122. Outside light is thus prevented from being incident on viewpoint region 300. Second lens 121 and first lens 123 are each desirably inclined with respect to reference beam Lc at an angle preventing reflected light from being incident on first mirror 122 when outside light incident along reference beam Lc is reflected by the incidence surface or the emission surface. Such inclination more desirably has an angle preventing reflected light from being incident on first mirror 122 when outside light emitted from first mirror 122 and incident on second lens 121 or first lens 123 is reflected by the incidence surface or the emission surface of second lens 121 or first lens 123. Second lens 121 and first lens 123 being inclined with respect to reference beam Lc indicates that second lens 121 and first lens 123 each have an optical refracting surface including a portion that is overlapped with reference beam Lc and is not horizontal with respect to a plane perpendicular to reference beam Lc.

Second lens 121 according to the present exemplary embodiment has a wedge shape with gradual decrease in lens thickness toward a lower end with respect to reference beam Lc. First lens 123 has a wedge shape with gradual decrease in lens thickness toward an upper end with respect to reference beam Lc. When second lens 121 is inclined with respect to reference beam Lc as described above and the emission surface of second lens 121 is assumed to be convex symmetrically with respect to reference beam Lc, beams passing a portion above reference beam Lc, of second lens 121 and beams passing another portion below reference beam Lc, of second lens 121 are different in terms of optical path length. When first lens 123 is similarly inclined with respect to reference beam Lc and the incidence surface of first lens 123 is assumed to be convex symmetrically with respect to reference beam Lc, beams passing a portion above reference beam Lc, of first lens 123 and beams passing another portion below reference beam Lc, of first lens 123 are different in terms of optical path length.

In view of this, second lens 121 according to the present exemplary embodiment has the wedge shape with gradual decrease in lens thickness toward the lower end with respect to reference beam Lc. First lens 123 has the wedge shape with gradual decrease in lens thickness toward the upper end with respect to reference beam Lc. This configuration causes beams emitted from display device 110 and transmitted through the portion above reference beam Lc, of second lens 121 (i.e. a thick portion of second lens 121) to be reflected by first mirror 122. The reflected beams pass the portion above reference beam Lc, of first lens 123 (i.e. a thin portion of first lens 123). Beams emitted from display device 110 and transmitted through the portion below reference beam Lc, of second lens 121 (i.e. a thin portion of second lens 121) are reflected by first mirror 122. The reflected beams pass the portion below reference beam Lc, of first lens 123 (i.e. a thick portion of first lens 123). Beams passing second lens 121 and first lens 123 are adjusted in terms of optical path length in this manner to uniformize optical path length of beams regardless of passed portions of second lens 121 and first lens 123.

The emission surface of second lens 121 according to the present exemplary embodiment is directed downward in comparison to the incidence surface. That is, second lens 121 has a wedge shape in the Y axis direction. Second lens 121 has the wedge sectional shape in the Y axis direction, so that light passing above second lens 121 is longer in optical path length than light passing below second lens 121. The optical path length until image light emitted from display device 110 reaches first mirror 122 can be changed in accordance with the position in the Y axis direction. This enables preferred correction of eccentric field curvature generated at first mirror 122.

[1-2. Effects and the Like]

Head-up display 100 exemplifying the head-up display according to the first exemplary embodiment is configured to project an image on windshield 220 (exemplifying a transparent reflection member) and cause observer D to visually recognize virtual image I. Head-up display 100 includes display device 110 exemplifying a display device, and projection optical system 140. Display device 110 displays an image. Projection optical system 140 is configured to form the image displayed by display device 110 as intermediate image M. First lens 123 included in projection optical system 140 is inclined with respect to reference beam Lc. Even in a case where outside light enters projection optical system 140, this configuration inhibits stray light caused by outside light reflected by first lens 123 or the like. Projection optical system 140 includes first lens 123 configured to condense light, and second mirror 124 exemplifying the first optical element configured to diffuse light, which are disposed in the order along the optical path from display device 110. In head-up display 100 according to the first exemplary embodiment, first lens 123 having positive power is disposed ahead of second mirror 124 having negative power and configured to form intermediate image M in the order along the optical path from display device 110 to achieve telephoto arrangement. This accordingly leads to reduction in entire length of relay optical system 120 and reduction in size of first lens 123 itself for reduction in size of head-up display 100.

Second mirror 124 exemplifies the first optical element according to the first exemplary embodiment. This enables formation of intermediate image M by enlarging an image displayed by small display device 110 and projection by further enlarging intermediate image M for observer D.

In head-up display 100 according to the first exemplary embodiment, first lens 123 has at least one free-form surface. This achieves inhibition of outside light reflection and preferred optical properties in an image optical system like head-up display 100.

Head-up display 100 according to the first exemplary embodiment includes first lens 123 having the wedge shape. Even when first lens 123 is inclined with respect to reference beam Lc, beams passing first lens 123 can thus be adjusted in terms of optical path length.

Head-up display 100 according to the first exemplary embodiment includes first mirror 122 exemplifying the second optical element, and second lens 121. First mirror 122 is disposed between display device 110 and first lens 123. Second lens 121 is disposed between display device 110 and first mirror 122. Second lens 121 has the wedge shape and includes at least one free-form surface. In head-up display 100 according to the first exemplary embodiment, first lens 123 and second lens 121 are disposed such that beams passing a thin portion of a first one of these lenses pass a thick portion of a second one of the lenses and beams passing a thick portion of the first one pass a thin portion of the second one. Even when first lens 123 and second lens 121 are inclined with respect to reference beam Lc, beams passing first lens 123 and second lens 121 can be uniformized in terms of optical path length.

In head-up display 100 according to the first exemplary embodiment, intermediate image M is an aerial image formed in a space on the optical path from display device 110 to virtual image I. This enables formation of intermediate image M by enlarging an image displayed by small display device 110 and adding any member configured to form intermediate image M.

Vehicle 200 exemplifying a moving body according to the first exemplary embodiment includes head-up display 100 and windshield 220 serving as a transparent reflection member. This configuration enables observer D as a driver of vehicle 200 to visually recognize an image projected on windshield 220 as virtual image I.

Second Exemplary Embodiment

The second exemplary embodiment will be described next with reference to FIG. 5.

[2-1. Configuration]

Figure 5:
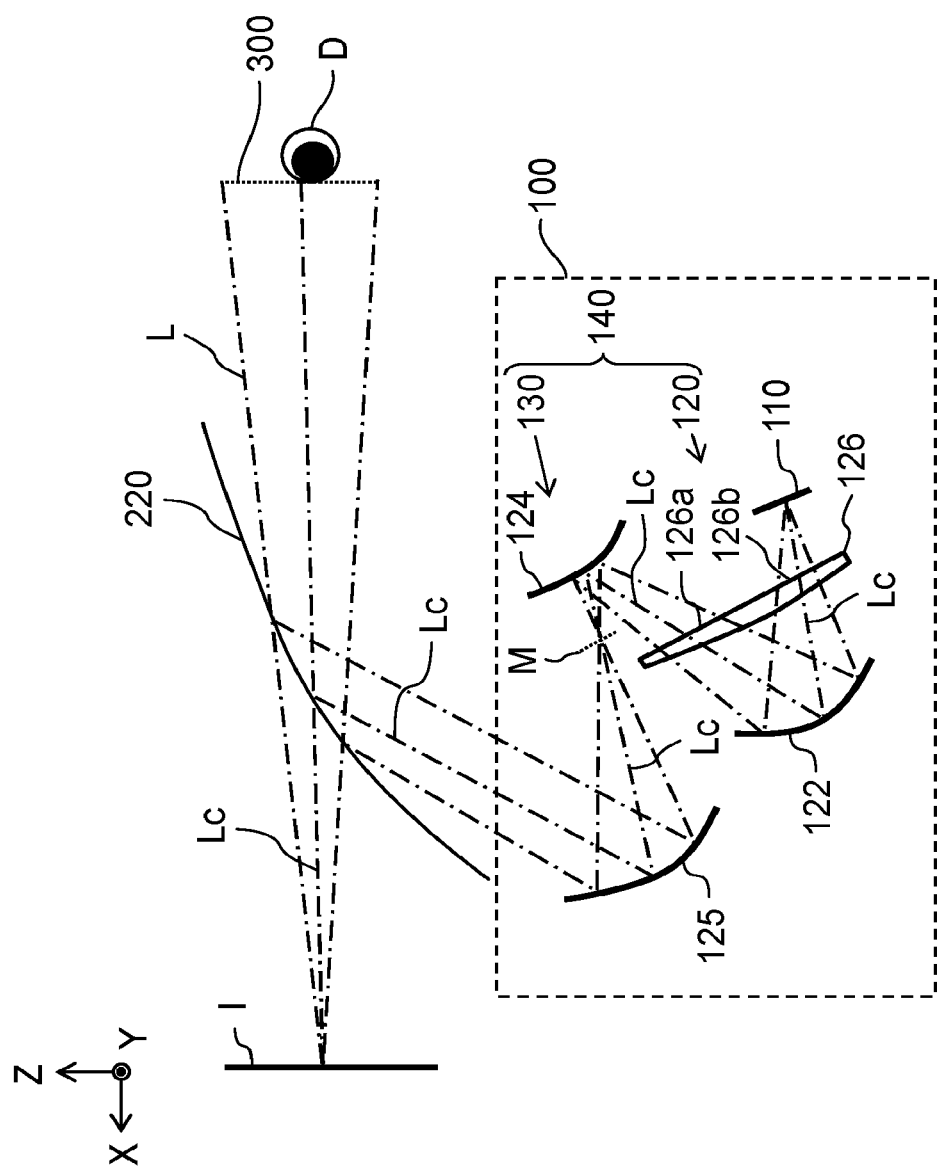
FIG. 5 is a schematic view depicting a configuration of a head-up display according to a second exemplary embodiment.

FIG. 5 is an explanatory schematic view depicting optical paths of head-up display 100 according to the second exemplary embodiment. As depicted in FIG. 5, head-up display 100 according to the present exemplary embodiment includes third lens 126 having first lens unit 126a, and second lens unit 126b integrally provided with first lens unit 126a, and first lens unit 126a and second lens unit 126b correspond to the first lens and the second lens according to the first exemplary embodiment.

Third lens 126 is positioned ahead of display device 110 and second mirror 124 in vehicle 200, as depicted in FIG. 5. As depicted in FIG. 5, third lens 126 has a surface facing first mirror 122 and shaped to be convex toward first mirror 122 in the X axis direction and the Y axis direction. As depicted in FIG. 5, third lens 126 has a surface facing display device 110 and second mirror 124 and having a planar shape with a plane directed toward display device 110 and second mirror 124. Third lens 126 is a free-form surface lens with the convex shape having difference between curvature in the X axis direction and curvature in the Y axis direction.

On the optical path from display device 110 to first mirror 122, second lens unit 126b has a planar surface serving as an incidence surface and a convex surface serving as an emission surface. The incidence surface and the emission surface of second lens unit 126b are inclined counterclockwise from reference beam Lc in the XZ planar view of FIG. 5. This configuration prevents stray light caused by outside light entering the case and being reflected by the display surface of display device 110 and first mirror 122.

On the optical path from first mirror 122 to second mirror 124, first lens unit 126a has a planar surface serving as an emission surface and a convex surface serving as an incidence surface. First lens unit 126a is inclined clockwise from reference beam Lc in the XZ planar view of FIG. 5. This configuration prevents stray light caused by outside light entering the case and being reflected by the display surface of display device 110 and first mirror 122.

In relay optical system 120 according to the present exemplary embodiment, first lens unit 126a having positive power and second mirror 124 having negative power are disposed after display device 110 and before intermediate image M. Relay optical system 120 has so-called telephoto arrangement. In such telephoto arrangement, first lens unit 126a increases negative power of second mirror 124 and second mirror 124 increases positive power of first lens unit 126a. That is, first lens unit 126a and second mirror 124 improve power each other. This leads to reduction in entire length of relay optical system 120 and reduction in size of head-up display 100.

As described above, the present exemplary embodiment provides first lens unit 126a disposed between first mirror 122 serving as the second optical element and third mirror 125 configured to project intermediate image M. Particularly, third lens 126 having positive power is disposed ahead of second mirror 124 having negative power and serving as the first optical element configured to form intermediate image M in the order along the optical path from display device 110. This leads to reduction in entire length of relay optical system 120 and reduction in size of first lens unit 126a itself for reduction in size of head-up display 100.

Third lens 126 according to the present exemplary embodiment includes first lens unit 126a and second lens unit 126b integrally provided with first lens unit 126a, and first lens unit 126a and second lens unit 126b correspond to second lens 121 and first lens 123 according to the first exemplary embodiment. First lens unit 126a and second lens unit 126b each have a wedge shape with gradual decrease in lens thickness toward the end relatively to the center of third lens 126. In the above case where third lens 126 is inclined with respect to reference beam Lc, beams passing a portion above reference beam Lc, of second lens unit 126b and beams passing another portion below reference beam Lc, of second lens unit 126b are different in terms of optical path length on the optical path from display device 110 to first mirror 122. Similarly, beams passing a portion above reference beam Lc, of second lens unit 126b and beams passing another portion below reference beam Lc, of second lens unit 126b are different in terms of optical path length on the optical path from first mirror 122 to second mirror 124.

In view of this, the present exemplary embodiment provides second lens unit 126b having the wedge shape with gradual decrease in lens thickness toward the lower end with respect to reference beam Lc, and first lens unit 126a having the wedge shape with gradual decrease in lens thickness toward the upper end with respect to reference beam Lc. This configuration causes beams emitted from display device 110 and transmitted through the portion above reference beam Lc, of second lens unit 126b (i.e. a thick portion of second lens unit 126b) to be reflected by first mirror 122. The reflected beams pass the portion above reference beam Lc, of first lens unit 126a (i.e. a thin portion of first lens unit 126a).

Beams emitted from display device 110 and transmitted through the portion below reference beam Lc, of second lens unit 126b (i.e. a thin portion of second lens unit 126b) are reflected by first mirror 122. The reflected beams pass the portion below reference beam Lc, of first lens unit 126a (i.e. a thick portion of first lens unit 126a).

In the present exemplary embodiment, beams passing second lens unit 126b and first lens unit 126a in third lens 126 are adjusted in terms of optical path length in this manner to uniformize optical path length of beams regardless of a passed portion of third lens 126.

Third lens 126 is desirably inclined with respect to reference beam Lc at an angle preventing reflected light from being incident on first mirror 122 when outside light incident along reference beam Lc is reflected by the incidence surface or the emission surface of third lens 126. Third lens 126 being inclined with respect to reference beam Lc indicates that third lens 126 has an optical refracting surface including a portion that is overlapped with reference beam Lc and is not horizontal with respective to a plane perpendicular to reference beam Lc.

On the optical path from display device 110 to first mirror 122, the emission surface of second lens unit 126b is directed downward in comparison to the incidence surface. Second lens unit 126b has a wedge shape in the Y axis direction. Second lens unit 126b has the wedge sectional shape in the Y axis direction, so that light passing above second lens unit 126b is longer in optical path length than light passing below second lens unit 126b on the optical path from display device 110 to the first mirror 122. The optical path length until image light emitted from display device 110 reaches first mirror 122 can be changed in accordance with the position in the Y axis direction. This enables preferred correction of eccentric field curvature generated at first mirror 122.

As described above, the present exemplary embodiment provides third lens 126 including first lens unit 126a and second lens unit 126b integrally provided with first lens unit 126a, and first lens unit 126a and second lens unit 126b correspond to second lens 121 and first lens 123 according to the first exemplary embodiment. This configuration achieves reduction in a number of components and reduction in production cost for head-up display 100.

[2-2. Effects and the Like]

Head-up display 100 exemplifying the head-up display according to the second exemplary embodiment is configured to cause observer D to visually recognize virtual image I. Head-up display 100 includes display device 110 exemplifying a display device, and projection optical system 140. Display device 110 displays an image. Projection optical system 140 is configured to form the image displayed by display device 110 as intermediate image M. Third lens 126 included in projection optical system 140 is inclined with respect to reference beam Lc. Even in a case where outside light enters projection optical system 140, this configuration inhibits stray light caused by outside light reflected by third lens 126 or the like. Projection optical system 140 includes third lens 126 configured to condense light, and second mirror 124 exemplifying the first optical element configured to diffuse light, which are disposed in the order along the optical path from display device 110. Third lens 126 includes first lens unit 126a and second lens unit 126b integrally provided with first lens unit 126a, and first lens unit 126a and second lens unit 126b correspond to first lens 123 and second lens 121 according to the first exemplary embodiment. In head-up display 100 according to the second exemplary embodiment, third lens 126 and second mirror 124 are disposed in the order along the optical path from display device 110. Accordingly, intermediate image M can be formed adjacent to an emission end of first lens unit 126a, and first lens unit 126a itself can be reduced in size. This leads to reduction in size of head-up display 100. Third lens 126 integrally includes second lens 121 and first lens 123 according to the first exemplary embodiment. This configuration achieves reduction in the number of components and reduction in production cost for head-up display 100.

Projection optical system 140 according to the second exemplary embodiment includes third lens 126 and second mirror 124 configured to diffuse light, which are disposed in the order along the optical path from display device 110. First lens unit 126a having positive power is thus disposed ahead of second mirror 124 having negative power and configured to form intermediate image M in the order along the optical path from display device 110 to achieve telephoto arrangement. This leads to reduction in entire length of relay optical system 120 and reduction in size of first lens unit 126a for reduction in size of head-up display 100.

In the present exemplary embodiment, beams emitted from display device 110 pass third lens 126 twice on the optical path from display device 110 to first mirror 122 and on the optical path from first mirror 122 to second mirror 124. Also in this case, projection optical system 140 similarly includes first mirror 122 configured to condense light, third lens 126 configured to condense light, second mirror 124 configured to diffuse light, and third mirror 125 configured to project intermediate image M, which are disposed in the order along the optical path from display device 110. Similarly, beams emitted from display device 110 proceed via first mirror 122, third lens 126, second mirror 124, and third mirror 125 in the mentioned order, and causes observer D to visually recognize virtual image I.

In head-up display 100 according to the second exemplary embodiment, third lens 126 has at least one free-form surface. This achieves inhibition of outside light reflection and preferred optical properties in an image optical system like head-up display 100.

Third lens 126 in head-up display 100 according to the second exemplary embodiment includes first lens unit 126a and second lens unit 126b each having the wedge shape. Even when third lens 126 is inclined with respect to reference beam Lc, beams passing third lens 126 can thus be adjusted in terms of optical path length.

In head-up display 100 according to the second exemplary embodiment, third lens 126, which integrally includes first lens unit 126a and second lens unit 126b corresponding to first lens 123 and second lens 121 according to the first exemplary embodiment, has the wedge shape. Accordingly, beams passing a thin portion of second lens unit 126b on the optical path from display device 110 to first mirror 122 pass a thick portion of first lens unit 126a on the optical path from first mirror 122 to second mirror 124. Similarly, beams passing a thick portion of second lens unit 126b on the optical path from display device 110 to first mirror 122 pass a thin portion of first lens unit 126a on the optical path from first mirror 122 to second mirror 124. Even when third lens 126 is inclined with respect to reference beam Lc, beams passing third lens 126 can thus be uniformized in terms of optical path length.

In head-up display 100 according to the second exemplary embodiment, intermediate image M is an aerial image formed in a space on the optical path from display device 110 to virtual image I. This enables formation of intermediate image M by enlarging an image displayed by small display device 110 and projection by further enlarging intermediate image M for observer D, without adding any member configured to form intermediate image M.

Third Exemplary Embodiment

The third exemplary embodiment will be described next with reference to FIG. 6.

[3-1. Configuration]

Figure 6:
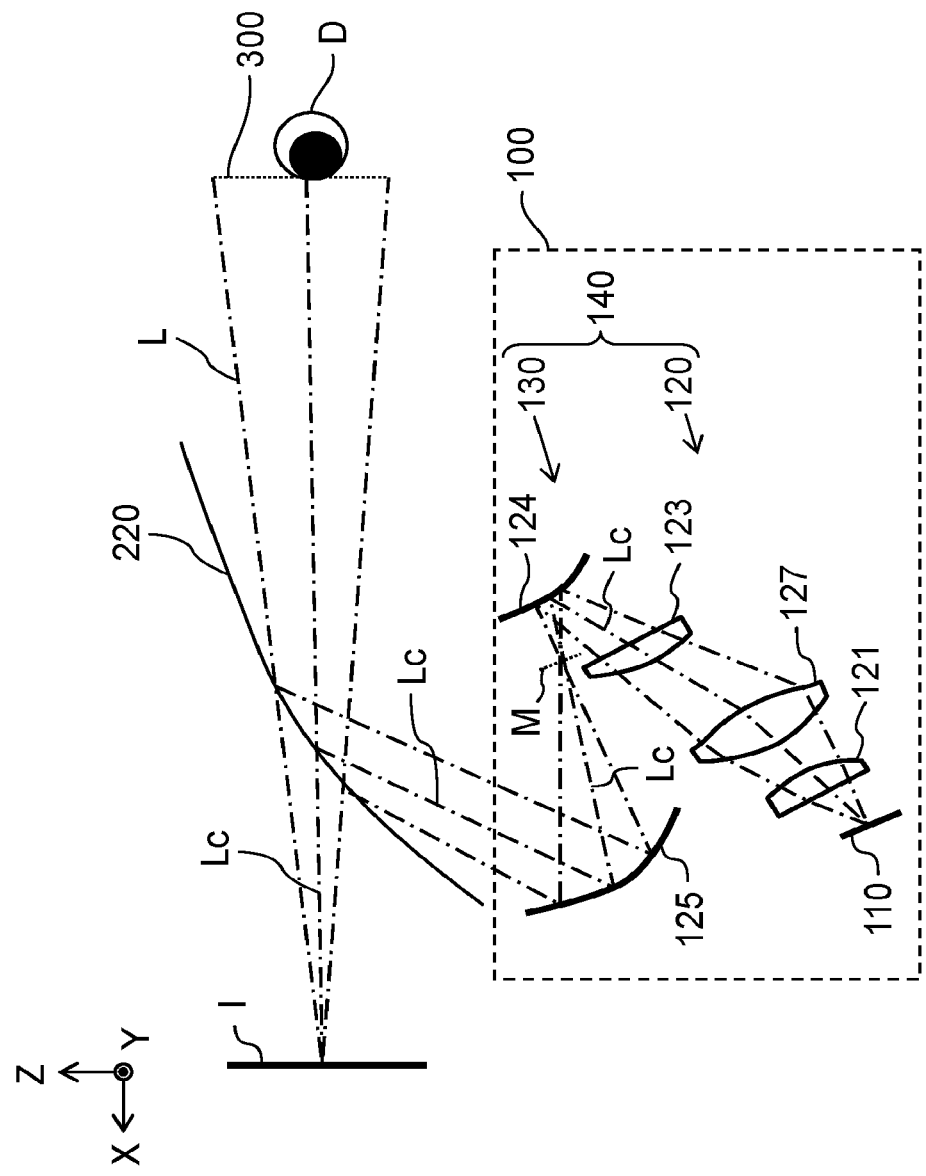
FIG. 6 is a schematic view depicting a configuration of a head-up display according to a third exemplary embodiment.

FIG. 6 is an explanatory schematic view depicting optical paths of head-up display 100 according to the third exemplary embodiment. As depicted in FIG. 6, head-up display 100 according to the present exemplary embodiment includes fourth lens 127 alternatively exemplifying the second optical element.

Display device 110 and second lens 121 according to the present exemplary embodiment are configured similarly to display device 110 and second lens 121 according to each of the exemplary embodiments described above. The present exemplary embodiment is different from the above exemplary embodiments in terms of disposed positions. As depicted in FIG. 6, display device 110 and second lens 121 according to the present exemplary embodiment are positioned ahead of fourth lens 127 serving as the second optical element in vehicle 200.

As depicted in FIG. 6, fourth lens 127 has an incidence surface facing second lens 121 and an emission surface facing first lens 123, both of which are shaped to be convex toward second lens 121 and first lens 123 in the X axis direction and the Y axis direction. Fourth lens 127 is a free-form surface lens with the convex shape having difference between curvature in the X axis direction and curvature in the Y axis direction.

Second lens 121, fourth lens 127, and first lens 123 according to the present exemplary embodiment are inclined clockwise from reference beam Lc in the XZ planar view of FIG. 6. This configuration prevents stray light caused by outside light entering the case and being reflected by second lens 121, fourth lens 127, or first lens 123.

As described above, the present exemplary embodiment adopts fourth lens 127 serving as the second optical element. First lens 123 is disposed between fourth lens 127 and third mirror 125 configured to project intermediate image M. Particularly, first lens 123 having positive power is disposed ahead of second mirror 124 having negative power and serving as the first optical element configured to form intermediate image M in the order along the optical path from display device 110. This leads to reduction in entire length of relay optical system 120 and reduction in size of first lens 123 itself for reduction in size of head-up display 100.

The present exemplary embodiment is different from the first exemplary embodiment in terms of positional relation between first lens 123 and second lens 121, and positions of thick portions and thin portions with respect to reference beam Lc are opposite to each other. Similarly to the first exemplary embodiment, beams passing second lens 121 and first lens 123 are thus adjusted in terms of optical path length to uniformize optical path length of beams regardless of passed portions of second lens 121 and first lens 123.

[3-2. Effects and the Like]

Head-up display 100 exemplifying the head-up display according to the third exemplary embodiment is configured to cause observer D to visually recognize virtual image I. Head-up display 100 includes display device 110 exemplifying a display device, and projection optical system 140. Display device 110 displays an image. Projection optical system 140 is configured to form the image displayed by display device 110 as intermediate image M. First lens 123 included in projection optical system 140 is inclined with respect to reference beam Lc. Even in a case where outside light enters projection optical system 140, this configuration inhibits stray light caused by outside light reflected by first lens 123, second lens 121, or fourth lens 127. Projection optical system 140 includes fourth lens 127 exemplifying the second optical element, first lens 123 configured to condense light, and second mirror 124 exemplifying the first optical element configured to diffuse light, which are disposed in the order along the optical path from display device 110. In head-up display 100 according to the third exemplary embodiment, first lens 123 having positive power is disposed ahead of second mirror 124 having negative power and configured to form intermediate image M in the order along the optical path from display device 110 to achieve telephoto arrangement. This accordingly leads to reduction in entire length of relay optical system 120 and reduction in size of first lens 123 itself for reduction in size of head-up display 100.

In head-up display 100 according to the third exemplary embodiment, first lens 123, second lens 121, and fourth lens 127 each have at least one free-form surface. This achieves inhibition of outside light reflection and preferred optical properties in an image optical system like head-up display 100.

Head-up display 100 according to the third exemplary embodiment includes first lens 123 and second lens 121 each having the wedge shape. Even when first lens 123 and second lens 121 are inclined with respect to reference beam Lc, beams passing first lens 123 and second lens 121 can thus be adjusted in terms of optical path length.

In head-up display 100 according to the third exemplary embodiment, positions, with respect to reference beam Lc, of thick portions and thin portions of first lens 123 and second lens 121 are opposite to each other. Similarly to the first exemplary embodiment, beams passing second lens 121 and first lens 123 are thus adjusted in terms of optical path length to uniformize optical path length of beams regardless of passed portions of second lens 121 and first lens 123.

In head-up display 100 according to the third exemplary embodiment, intermediate image M is an aerial image formed in a space on the optical path from display device 110 to virtual image I. This enables formation of intermediate image M by enlarging an image displayed by small display device 110 and projection by further enlarging intermediate image M for observer D, without adding any member configured to form intermediate image M.

Fourth Exemplary Embodiment

The fourth exemplary embodiment will be described next with reference to FIG. 7.

[4-1. Configuration]

Figure 7:
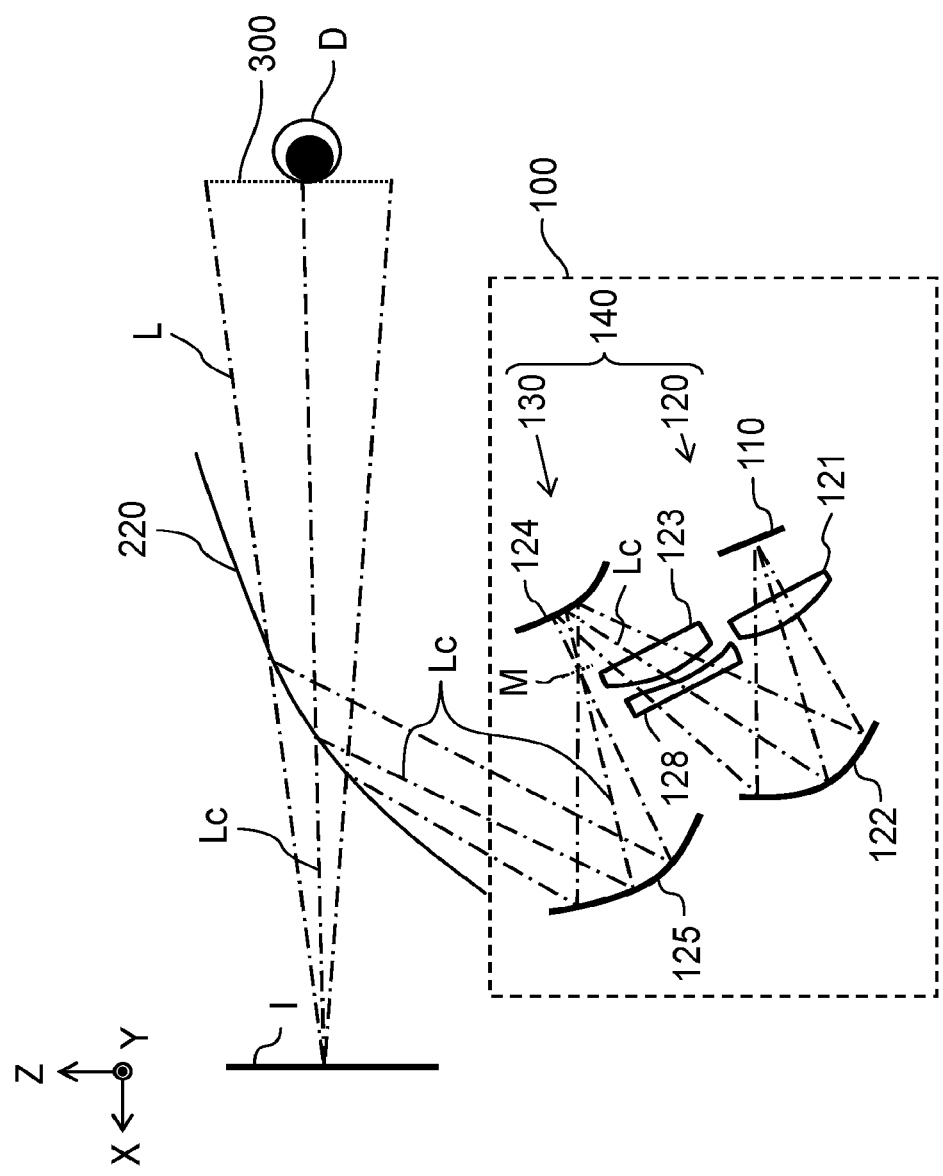
FIG. 7 is a view depicting behavior of a head-up display according to a fourth exemplary embodiment.

FIG. 7 is an explanatory schematic view depicting optical paths of head-up display 100 according to the fourth exemplary embodiment. As depicted in FIG. 7, head-up display 100 according to the present exemplary embodiment includes fifth lens 128 disposed ahead of first lens 123 on the optical path from first mirror 122 to second mirror 124.

Fifth lens 128 is a free-form surface lens having difference between curvature in the X axis direction and curvature in the Y axis direction. Fifth lens 128 has a planar incidence surface adjacent to first mirror 122 and an emission surface adjacent to first lens 123 and concave toward first lens 123 in the X axis direction. The emission surface of fifth lens 128 has curvature in the Y axis direction less than curvature in the X axis direction. That is, fifth lens 128 has a shape in the Y axis direction, provided with a concave surface having the curvature less than the curvature in the X axis direction, a convex surface, or a planar surface.

As depicted in FIG. 7, the incidence surface and the emission surface of fifth lens 128 according to the present exemplary embodiment are inclined clockwise from reference beam Lc in the XZ planar view of FIG. 7. This configuration causes reflected light to pass above fifth lens 128. The reflected light is thus prevented from being incident on viewpoint region 300. Fifth lens 128 is desirably inclined with respect to reference beam Lc at an angle preventing reflected light from being incident on first mirror 122 and second mirror 124 when outside light incident along reference beam Lc is reflected by the incidence surface or the emission surface. Such inclination more desirably has an angle preventing reflected light from being incident on first mirror 122 when outside light emitted from first mirror 122 and incident on fifth lens 128 is reflected by the incidence surface or the emission surface of fifth lens 128. Fifth lens 128 being inclined with respect to reference beam Lc indicates that fifth lens 128 has an optical refracting surface including a portion that is overlapped with reference beam Lc and is not horizontal with respective to a plane perpendicular to reference beam Lc.

Fifth lens 128 is a lens element having negative refractive power. Fifth lens 128 thus configured is disposed ahead of first lens 123 on the optical path from first mirror 122 to second mirror 124, to inhibit chromatic aberration generated at first lens 123.

In projection optical system 140 according to the present exemplary embodiment, fifth lens 128, first mirror 122 serving as the second optical element configured to condense light, and second mirror 124 serving as the first optical element configured to form intermediate image M are disposed in the order along the optical path from display device 110. First lens 123 is disposed ahead of second mirror 124 configured to form intermediate image M in the order along the optical path from display device 110, so that intermediate image M can be formed adjacent to the emission end of first lens 123. First lens 123 itself can thus be reduced in size. This leads to reduction in size of head-up display 100. Furthermore, the negative refractive power of fifth lens 128 inhibits chromatic aberration generated at first lens 123.

In relay optical system 120 according to the present exemplary embodiment, first lens 123 having positive power and second mirror 124 having negative power are disposed after display device 110 and before intermediate image M. Relay optical system 120 has so-called telephoto arrangement. In such telephoto arrangement, first lens 123 increases negative power of second mirror 124 and second mirror 124 increases positive power of first lens 123. That is, first lens 123 and second mirror 124 improve power each other. This leads to reduction in entire length of relay optical system 120 and reduction in size of head-up display 100.

As depicted in FIG. 7, the incidence surface and the emission surface of second lens 121 according to the present exemplary embodiment are inclined counterclockwise from reference beam Lc in the XZ planar view of FIG. 7. Furthermore, the incidence surface and the emission surface of first lens 123 are inclined clockwise from reference beam Lc in the XZ planar view of FIG. 7. Reflected light of outside light at first lens 123 is reflected to pass below second mirror 124, and reflected light of outside light at second lens 121 is reflected to pass below first mirror 122. The reflected light is thus prevented from being incident on viewpoint region 300. Second lens 121 and first lens 123 are each desirably inclined with respect to reference beam Lc at an angle preventing reflected light from being incident on first mirror 122 or second mirror 124 when outside light incident along reference beam Lc is reflected by the incidence surface or the emission surface. Such inclination more desirably has an angle preventing reflected light from being incident on first mirror 122 when outside light emitted from first mirror 122 and incident on second lens 121 or first lens 123 is reflected by the incidence surface or the emission surface of second lens 121 or first lens 123. Second lens 121 and first lens 123 being inclined with respect to reference beam Lc indicates that second lens 121 and first lens 123 each have an optical refracting surface including a portion that is overlapped with reference beam Lc and is not horizontal with respect to a plane perpendicular to reference beam Lc.

Similarly to the first exemplary embodiment, positions of thick portions and thin portions of first lens 123 and second lens 121 with respect to reference beam Lc are opposite to each other. Similarly to the first exemplary embodiment, beams passing second lens 121 and first lens 123 are thus adjusted in terms of optical path length to uniformize optical path length of beams regardless of passed portions of second lens 121 and first lens 123.

[4-2. Effects and the Like]

Head-up display 100 exemplifying the head-up display according to the fourth exemplary embodiment is configured to cause observer D to visually recognize virtual image I. Head-up display 100 includes display device 110 exemplifying a display device, and projection optical system 140. Display device 110 displays an image. Projection optical system 140 is configured to form the image displayed by display device 110 as intermediate image M. First lens 123 included in projection optical system 140 is inclined with respect to reference beam Lc. Even in a case where outside light enters projection optical system 140, this configuration inhibits stray light caused by outside light reflected by fifth lens 128 or the like. Projection optical system 140 includes first lens 123 configured to condense light, and second mirror 124 exemplifying the first optical element configured to diffuse light, which are disposed in the order along the optical path from display device 110. In head-up display 100 according to the fourth exemplary embodiment, first lens 123 having positive power is disposed ahead of second mirror 124 having negative power and configured to form intermediate image M in the order along the optical path from display device 110 to achieve telephoto arrangement. This accordingly leads to reduction in entire length of relay optical system 120 and reduction in size of first lens 123 itself for reduction in size of head-up display 100. Furthermore, fifth lens 128 is disposed ahead of first lens 123 in the order along the optical path from display device 110. The negative refractive power of fifth lens 128 can thus inhibit chromatic aberration generated at first lens 123.

Head-up display 100 according to the fourth exemplary embodiment includes first mirror 122 exemplifying the second optical element, and second mirror 124 exemplifying the first optical element. This enables formation of intermediate image M by sufficiently enlarging an image displayed by small display device 110, and projection by further enlarging intermediate image M for observer D.

In head-up display 100 according to the fourth exemplary embodiment, second lens 121, first lens 123, and fifth lens 128 each have at least one free-form surface. This achieves inhibition of outside light reflection and preferred optical properties in an image optical system like head-up display 100.

Head-up display 100 according to the fourth exemplary embodiment includes first lens 123 and second lens 121 each having the wedge shape. Even when first lens 123 and second lens 121 are inclined with respect to reference beam Lc, beams passing first lens 123 and second lens 121 can thus be adjusted in terms of optical path length.

Head-up display 100 according to the fourth exemplary embodiment includes second lens 121 disposed between display device 110 and first mirror 122. Second lens 121 has the wedge shape and includes at least one free-form surface. In head-up display 100 according to the fourth exemplary embodiment, first lens 123 and second lens 121 are disposed such that beams passing a thin portion of a first one of these lenses pass a thick portion of a second one of the lenses and beams passing a thick portion of the first one pass a thin portion of the second one. Even when first lens 123 and second lens 121 are inclined with respect to reference beam Lc, beams passing first lens 123 and second lens 121 can be uniformized in terms of optical path length.

In head-up display 100 according to the fourth exemplary embodiment, intermediate image M is an aerial image formed in a space on the optical path from display device 110 to virtual image I. This enables formation of intermediate image M by enlarging an image displayed by small display device 110 and projection by further enlarging intermediate image M for observer D, without adding any member configured to form intermediate image M.

Fifth Exemplary Embodiment

The fifth exemplary embodiment will be described next with reference to FIG. 8.

[5-1. Configuration]

Figure 8:
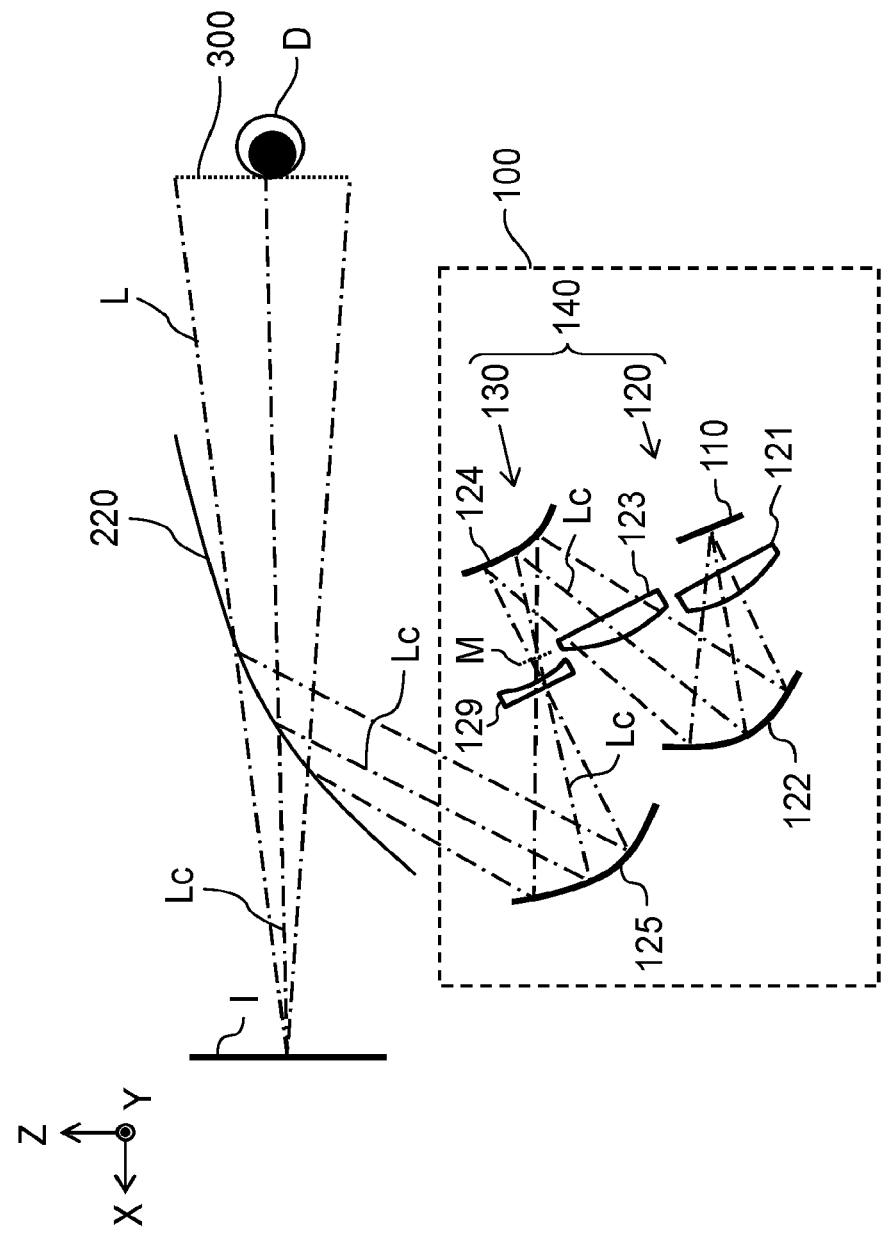
FIG. 8 is a schematic view depicting a configuration of a head-up display according to a fifth exemplary embodiment.

FIG. 8 is an explanatory schematic view depicting optical paths of head-up display 100 according to the fifth exemplary embodiment. As depicted in FIG. 8, head-up display 100 according to the present exemplary embodiment includes sixth lens 129 disposed behind intermediate image M in the order along the optical path from second mirror 124 to third mirror 125.

Sixth lens 129 is a free-form surface lens having difference between curvature in the X axis direction and curvature in the Y axis direction. Sixth lens 129 has a planar emission surface adjacent to third mirror 125 and an incidence surface adjacent to intermediate image M and concave toward first lens 123 in the X axis direction. The incidence surface of second mirror 124 has curvature in the Y axis direction less than curvature in the X axis direction. That is, sixth lens 129 has a shape in the Y axis direction, provided with a concave surface having the curvature less than the curvature in the X axis direction, a convex surface, or a planar surface.

As depicted in FIG. 8, the incidence surface and the emission surface of sixth lens 129 according to the present exemplary embodiment are inclined counterclockwise from reference beam Lc in the XZ planar view of FIG. 8. This configuration causes reflected light to pass below sixth lens 129. The reflected light is thus prevented from being incident on viewpoint region 300. Sixth lens 129 is desirably inclined with respect to reference beam Lc at an angle preventing reflected light from being incident on third mirror 125 and second mirror 124 when outside light incident along reference beam Lc is reflected by the incidence surface or the emission surface. Such inclination more desirably has an angle preventing reflected light from being incident on second mirror 124 and third mirror 125 when outside light emitted from second mirror 124 and incident on sixth lens 129 is reflected by the incidence surface or the emission surface of sixth lens 129. Sixth lens 129 being inclined with respect to reference beam Lc indicates that sixth lens 129 has an optical refracting surface including a portion that is overlapped with reference beam Lc and is not horizontal with respective to a plane perpendicular to reference beam Lc.

Sixth lens 129 is a lens element having negative refractive power. Sixth lens 129 thus configured is disposed behind the optical elements of relay optical system 120 on the optical path from display device 110 to third mirror 125. This configuration reduces an aberration correction load of the optical elements to achieve higher resolution.

In projection optical system 140 according to the present exemplary embodiment, first mirror 122 serving as the second optical element configured to condense light and second mirror 124 serving as the first optical element configured to form intermediate image M are disposed in the order along the optical path from display device 110. First lens 123 is disposed ahead of second mirror 124 configured to form intermediate image M in the order along the optical path from display device 110, so that intermediate image M can be formed adjacent to the emission end of first lens 123. First lens 123 itself can thus be reduced in size. This leads to reduction in size of head-up display 100. Sixth lens 129 is disposed behind intermediate image M. This configuration reduces the aberration correction load of the optical elements in relay optical system 120 to achieve higher resolution.

In relay optical system 120 according to the present exemplary embodiment, first lens 123 having positive power and second mirror 124 having negative power are disposed after display device 110 and before intermediate image M. Relay optical system 120 has so-called telephoto arrangement. In such telephoto arrangement, first lens 123 increases negative power of second mirror 124 and second mirror 124 increases positive power of first lens 123. That is, first lens 123 and second mirror 124 improve power each other. This leads to reduction in entire length of relay optical system 120 and reduction in size of head-up display 100.

As depicted in FIG. 8, the incidence surface and the emission surface of second lens 121 according to the present exemplary embodiment are inclined counterclockwise from reference beam Lc in the XZ planar view of FIG. 8. Furthermore, the incidence surface and the emission surface of first lens 123 are inclined clockwise from reference beam Lc in the XZ planar view of FIG. 8. Reflected light of outside light at first lens 123 is reflected to pass below second mirror 124, and reflected light of outside light at second lens 121 is reflected to pass below first mirror 122. The reflected light is thus prevented from being incident on viewpoint region 300. Second lens 121 and first lens 123 are each desirably inclined with respect to reference beam Lc at an angle preventing reflected light from being incident on first mirror 122 or second mirror 124 when outside light incident along reference beam Lc is reflected by the incidence surface or the emission surface. Such inclination more desirably has an angle preventing reflected light from being incident on first mirror 122 when outside light emitted from first mirror 122 and incident on second lens 121 or first lens 123 is reflected by the incidence surface or the emission surface of second lens 121 or first lens 123. Second lens 121 and first lens 123 being inclined with respect to reference beam Lc indicates that second lens 121 and first lens 123 each have an optical refracting surface including a portion that is overlapped with reference beam Lc and is not horizontal with respect to a plane perpendicular to reference beam Lc.

Similarly to the first exemplary embodiment, positions of thick portions and thin portions of first lens 123 and second lens 121 with respect to reference beam Lc are opposite to each other. Similarly to the first exemplary embodiment, beams passing second lens 121 and first lens 123 are thus adjusted in terms of optical path length to uniformize optical path length of beams regardless of passed portions of second lens 121 and first lens 123.

[5-2. Effects and the Like]

Head-up display 100 exemplifying the head-up display according to the fifth exemplary embodiment is configured to cause observer D to visually recognize virtual image I. Head-up display 100 includes display device 110 exemplifying a display device, and projection optical system 140. Display device 110 displays an image. Projection optical system 140 is configured to form the image displayed by display device 110 as intermediate image M. First lens 123 included in projection optical system 140 is inclined with respect to reference beam Lc. Even in a case where outside light enters projection optical system 140, this configuration inhibits stray light caused by outside light reflected by sixth lens 129 or the like. Projection optical system 140 includes first lens 123 configured to condense light, and second mirror 124 exemplifying the first optical element configured to diffuse light, which are disposed in the order along the optical path from display device 110. In head-up display 100 according to the fifth exemplary embodiment, first lens 123 having positive power is disposed ahead of second mirror 124 having negative power and configured to form intermediate image M in the order along the optical path from display device 110 to achieve telephoto arrangement. This accordingly leads to reduction in entire length of relay optical system 120 and reduction in size of first lens 123 itself for reduction in size of head-up display 100. Furthermore, sixth lens 129 is disposed behind relay optical system 120 in the order along the optical path from display device 110. This configuration reduces the aberration correction load of the optical elements in relay optical system 120 to achieve higher resolution.

Head-up display 100 according to the fifth exemplary embodiment includes first mirror 122 exemplifying the second optical element, and second mirror 124 exemplifying the first optical element. This enables formation of intermediate image M by sufficiently enlarging an image displayed by small display device 110, and projection by further enlarging intermediate image M for observer D.

In head-up display 100 according to the fifth exemplary embodiment, second lens 121, first lens 123, and sixth lens 129 each have at least one free-form surface. This achieves inhibition of outside light reflection and preferred optical properties in an image optical system like head-up display 100.

Head-up display 100 according to the fifth exemplary embodiment includes first lens 123 and second lens 121 each having the wedge shape. Even when first lens 123 and second lens 121 are inclined with respect to reference beam Lc, beams passing first lens 123 and second lens 121 can thus be adjusted in terms of optical path length.

Head-up display 100 according to the fifth exemplary embodiment includes second lens 121 disposed between display device 110 and first mirror 122. Second lens 121 has the wedge shape and includes at least one free-form surface. In head-up display 100 according to the fourth exemplary embodiment, first lens 123 and second lens 121 are disposed such that beams passing a thin portion of a first one of these lenses pass a thick portion of a second one of the lenses and beams passing a thick portion of the first one pass a thin portion of the second one. Even when first lens 123 and second lens 121 are inclined with respect to reference beam Lc, beams passing first lens 123 and second lens 121 can be uniformized in terms of optical path length.

In head-up display 100 according to the fifth exemplary embodiment, intermediate image M is an aerial image formed in a space on the optical path from display device 110 to virtual image I. This enables formation of intermediate image M by enlarging an image displayed by small display device 110 and adding any member configured to form intermediate image M.

Sixth Exemplary Embodiment

Figure 9:
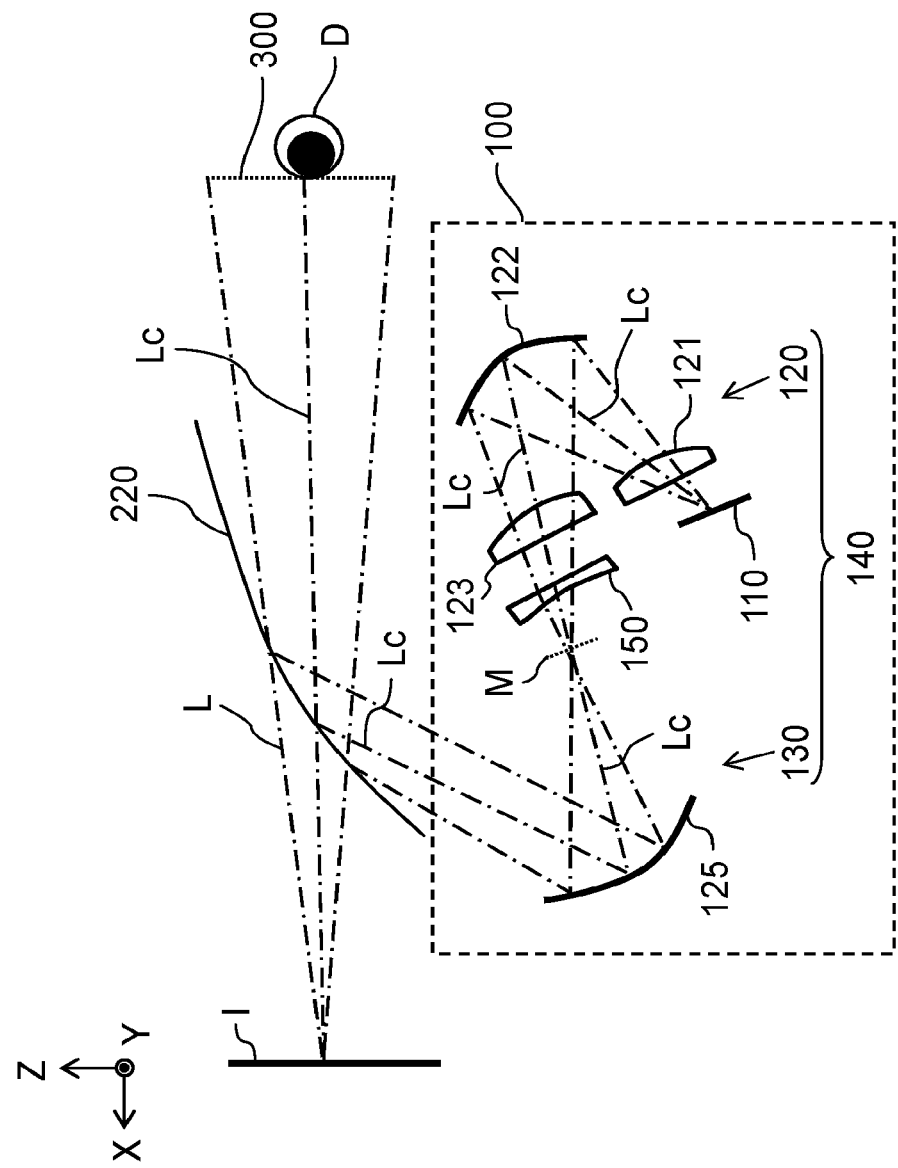
FIG. 9 is a view depicting behavior of a head-up display according to a sixth exemplary embodiment.

The sixth exemplary embodiment will be described next with reference to FIG. 9.
[6-1. Configuration]
FIG. 9 is an explanatory schematic view depicting optical paths of head-up display 100 according to the sixth exemplary embodiment. As depicted in FIG. 9, head-up display 100 according to the present exemplary embodiment includes seventh lens 150 alternatively exemplifying the first optical element.

First mirror 122 according to the present exemplary embodiment is configured similarly to first mirror 122 according to each of the first and second exemplary embodiments. The present exemplary embodiment is different from the above exemplary embodiments in terms of disposed positions. As depicted in FIG. 9, first mirror 122 according to the present exemplary embodiment is disposed in head-up display 100 at a rearmost position of vehicle 200. Display device 110 and second lens 121 according to the present exemplary embodiment are configured similarly to display device 110 and second lens 121 according to each of the above exemplary embodiments. The present exemplary embodiment is different from the above exemplary embodiments in terms of disposed positions. As depicted in FIG. 9, display device 110 and second lens 121 according to the present exemplary embodiment are positioned ahead of first mirror 122 in vehicle 200.

First lens 123 according to the present exemplary embodiment is configured similarly to first lens 123 according to each of the first and third exemplary embodiments. The present exemplary embodiment is, however, different in terms of the disposed position. First lens 123 according to the present exemplary embodiment is positioned behind seventh lens 150 serving as the first optical element in vehicle 200.

Seventh lens 150 is a free-form surface lens having difference between curvature in the X axis direction and curvature in the Y axis direction. Seventh lens 150 has a planar incidence surface adjacent to first lens 123 and an emission surface adjacent to third mirror 125 and concave toward third mirror 125 in the X axis direction. The emission surface of seventh lens 150 has curvature in the Y axis direction less than curvature in the X axis direction. That is, seventh lens 150 has a shape in the Y axis direction, provided with a concave surface having the curvature less than the curvature in the X axis direction, a convex surface, or a planar surface.

As depicted in FIG. 9, the incidence surface and the emission surface of seventh lens 150 according to the present exemplary embodiment are inclined counterclockwise from reference beam Lc in the XZ planar view of FIG. 9. This configuration causes reflected light to pass below seventh lens 150. The reflected light is thus prevented from being incident on viewpoint region 300. Seventh lens 150 is desirably inclined with respect to reference beam Lc at an angle preventing reflected light from being incident on first mirror 122 and third mirror 125 when outside light incident along reference beam Lc is reflected by the incidence surface or the emission surface. Such inclination more desirably has an angle preventing reflected light from being incident on first mirror 122 when outside light emitted from first mirror 122 and incident on seventh lens 150 is reflected by the incidence surface or the emission surface of seventh lens 150. Seventh lens 150 being inclined with respect to reference beam Lc indicates that seventh lens 150 has an optical refracting surface including a portion that is overlapped with reference beam Lc and is not horizontal with respective to a plane perpendicular to reference beam Lc.

Furthermore, the emission surface of seventh lens 150 has a wedge shape in the XZ planar view of FIG. 9. Seventh lens 150 has the wedge sectional shape in the Y axis direction, so that light passing above seventh lens 150 is longer in optical path length than light passing below seventh lens 150. The optical path length until image light emitted from display device 110 forms intermediate image M can be changed in accordance with the position in the Y axis direction. This enables preferred correction of eccentric field curvature generated at first mirror 122.

In projection optical system 140 according to the present exemplary embodiment, first mirror 122 serving as the second optical element configured to condense light and seventh lens 150 serving as the first optical element configured to form intermediate image M are disposed in the order along the optical path from display device 110. First mirror 122 and seventh lens 150 interpose first lens 123 configured to condense light. First lens 123 is disposed between first mirror 122 configured to form intermediate image M and seventh lens 150 configured to form intermediate image M, so that intermediate image M can be formed adjacent to the emission end of first lens 123. First lens 123 itself can thus be reduced in size. This leads to reduction in size of head-up display 100.

In relay optical system 120 according to the present exemplary embodiment, first lens 123 having positive power and seventh lens 150 having negative power are disposed after display device 110 and before intermediate image M. Relay optical system 120 has so-called telephoto arrangement. In such telephoto arrangement, first lens 123 increases negative power of seventh lens 150 and seventh lens 150 increases positive power of first lens 123. That is, first lens 123 and seventh lens 150 improve power each other. This leads to reduction in entire length of relay optical system 120 and reduction in size of head-up display 100.

As depicted in FIG. 9, the incidence surface and the emission surface of second lens 121 according to the present exemplary embodiment are inclined clockwise from reference beam Lc in the XZ planar view of FIG. 9. Furthermore, the incidence surface and the emission surface of first lens 123 are inclined counterclockwise from reference beam Lc in the XZ planar view of FIG. 9. Reflected light of outside light at first lens 123 is reflected to pass above first mirror 122, whereas reflected light of outside light at second lens 121 is reflected to pass below first mirror 122. The reflected light is thus prevented from being incident on viewpoint region 300. Second lens 121 and first lens 123 are each desirably inclined with respect to reference beam Lc at an angle preventing reflected light from being incident on first mirror 122 when outside light incident along reference beam Lc is reflected by the incidence surface or the emission surface. Such inclination more desirably has an angle preventing reflected light from being incident on first mirror 122 when outside light emitted from first mirror 122 and incident on second lens 121 or first lens 123 is reflected by the incidence surface or the emission surface of second lens 121 or first lens 123. Second lens 121 and first lens 123 being inclined with respect to reference beam Lc indicates that second lens 121 and first lens 123 each have an optical refracting surface including a portion that is overlapped with reference beam Lc and is not horizontal with respect to a plane perpendicular to reference beam Lc.

Similarly to the first exemplary embodiment, positions of thick portions and thin portions of first lens 123 and second lens 121 with respect to reference beam Lc are opposite to each other. Similarly to the first exemplary embodiment, beams passing second lens 121 and first lens 123 are thus adjusted in terms of optical path length to uniformize optical path length of beams regardless of passed portions of second lens 121 and first lens 123.

[6-2. Effects and the Like]

Head-up display 100 exemplifying the head-up display according to the sixth exemplary embodiment is configured to cause observer D to visually recognize virtual image I. Head-up display 100 includes display device 110 exemplifying a display device, and projection optical system 140. Display device 110 displays an image. Projection optical system 140 is configured to form the image displayed by display device 110 as intermediate image M. First lens 123 included in projection optical system 140 is inclined with respect to reference beam Lc. Even in a case where outside light enters projection optical system 140, this configuration inhibits stray light caused by outside light reflected by seventh lens 150 or the like. Projection optical system 140 includes first lens 123 configured to condense light, and seventh lens 150 exemplifying the first optical element, which are disposed in the order along the optical path from display device 110. In head-up display 100 according to the sixth exemplary embodiment, first lens 123 having positive power is disposed ahead of seventh lens 150 having negative power and configured to form intermediate image M in the order along the optical path from display device 110 to achieve telephoto arrangement. This accordingly leads to reduction in entire length of relay optical system 120 and reduction in size of first lens 123 itself for reduction in size of head-up display 100.

The sixth exemplary embodiment adopts first mirror 122 exemplifying the second optical element, and third mirror 125 serving as projection optical system 130. This enables formation of intermediate image M by sufficiently enlarging an image displayed by small display device 110, and projection by further enlarging intermediate image M for observer D.

Head-up display 100 according to the sixth exemplary embodiment includes seventh lens 150 having negative power, exemplifying the first optical element, and disposed adjacent to intermediate image M. Seventh lens 150 thus serves as a so-called field lens. This enables reduction in size of first lens 123, first mirror 122, and second lens 121.

In head-up display 100 according to the sixth exemplary embodiment, first lens 123, second lens 121, and seventh lens 150 each have at least one free-form surface. This achieves inhibition of outside light reflection and preferred optical properties in an image optical system like head-up display 100.

Head-up display 100 according to the sixth exemplary embodiment includes first lens 123, second lens 121, and seventh lens 150 each having the wedge shape. Even when first lens 123, second lens 121, and seventh lens 150 are inclined with respect to reference beam Lc, beams passing first lens 123, second lens 121, and seventh lens 150 can be adjusted in terms of optical path length.

Head-up display 100 according to the sixth exemplary embodiment includes second lens 121 disposed between display device 110 and first mirror 122 exemplifying the second optical element. Second lens 121 has the wedge shape and includes at least one free-form surface. In head-up display 100 according to the sixth exemplary embodiment, first lens 123 and second lens 121 are disposed such that beams passing a thin portion of a first one of these lenses pass a thick portion of a second one of the lenses and beams passing a thick portion of the first one pass a thin portion of the second one. Even when first lens 123 and second lens 121 are inclined with respect to reference beam Lc, beams passing first lens 123 and second lens 121 can be uniformized in terms of optical path length.

In head-up display 100 according to the sixth exemplary embodiment, intermediate image M is an aerial image formed in a space on the optical path from display device 110 to virtual image I. This enables formation of intermediate image M by enlarging an image displayed by small display device 110 and adding any member configured to form intermediate image M.

Other Exemplary Embodiments

The first to sixth exemplary embodiments have been described above as exemplification of the technique disclosed in the present application. The technique disclosed in the present disclosure should not be limitedly applicable to these exemplary embodiments, but is also applicable to any exemplary embodiment achieved by modification, replacement, addition, removal, or the like. Furthermore, constituent elements described in the first to sixth exemplary embodiments can be combined to achieve any new exemplary embodiment.

The first to sixth exemplary embodiments each provide second lens 121 exemplifying a dioptric system disposed between display device 110 and first mirror 122. The dioptric system is not limited to second lens 121 constituted y a single lens element. The dioptric system may include a plurality of lens elements disposed between display device 110 and first mirror 122. In the case where the plurality of lens elements is provided, the lens element initially receiving light emitted from the display device desirably has positive power.

The first to sixth exemplary embodiments each provide single third mirror 125 serving as projection optical system 140. Two or more mirrors may alternatively be disposed. Such a mirror to be added may be disposed ahead of third mirror 125 in the vehicle, or may be disposed laterally inside or outside the vehicle, specifically, vertically on the sheet of any one of FIG. 1, FIG. 2, and FIG. 4 to FIG. 9.

The first to sixth exemplary embodiments each adopt relay optical system 120 including a lens element. However, head-up display 100 should not be limited to such a configuration. For example, third mirror 125 and windshield 220 may interpose any additional lens element.

First mirror 122, second mirror 124, and third mirror 125 in head-up display 100 according to any one of the first to sixth exemplary embodiments are assumed as rotationally asymmetric mirrors. However, these mirrors should not be limited to such rotationally asymmetric mirrors. These mirrors may alternatively be shaped to have a so-called saddle surface having difference in sign between curvature in the X axis direction and curvature the Y axis direction.

The lens elements adopted in any one of the first to sixth exemplary embodiments should not be limited to have the free-form surface. The surface of each of the lens elements may alternatively have a toroidal shape, an anamorphic shape, or a cylindrical shape. Furthermore, the lens in any one of these shapes may be disposed eccentric with respect to reference beam Lc.

The emission surface of fifth lens 128 according to the fourth exemplary embodiment, the incidence surface of sixth lens 129 according to the fifth exemplary embodiment, and the emission surface according to the sixth exemplary embodiment do not need to be entirely concave in the X direction, but may locally have a convex surface.

The planar surface of each of the lens elements according to the first to sixth exemplary embodiments may be convex, concave, or locally curved.

The reflecting surface of each of first mirror 122, second mirror 124, and third mirror 125 according to any one of the first to fifth exemplary embodiments should not be limited to the free-form surface. The reflecting surface of each of these mirrors may alternatively have a spherical shape, an aspherical surface, a toroidal shape, or an anamorphic shape. The mirror in any one of these shapes may be disposed eccentric with respect to reference beam Lc.

Head-up display 100 according to any one of the first to sixth exemplary embodiments is disposed below dashboard 210, but may alternatively be disposed above dashboard 210.

The exemplary embodiments have been described above as exemplification of the technique disclosed in the present disclosure. There have been provided the accompanying drawings and the detailed description. Accordingly, the constituent elements mentioned in the accompanying drawings and the detailed description may include constituent elements essentially needed for achievement of an object as well as constituent elements inessentially needed for achievement of the object. Such inessential constituent elements should not be regarded as being essential just because these constituent elements are mentioned in the accompanying drawings and the detailed description.

The above exemplary embodiments are provided to exemplify the technique disclosed in the present disclosure, and can thus be subjected to modification, replacement, addition, removal, or the like in various manners within the scope of claims or an equivalent scope.

SUMMARY OF EXEMPLARY EMBODIMENTS (1) The present disclosure provides a head-up display configured to project an image on a transparent reflection member to cause an observer to visually recognize a virtual image, and including: a display device configured to display the image; and a projection optical system configured to project the image displayed by the display device as the virtual image for the observer. The projection optical system is configured to form the image as an intermediate image, and includes a first lens configured to condense light, and a first optical element configured to diffuse light. The first lens and the first optical element are disposed in an order along an optical path from the display device. When a beam reaching a center of a viewpoint region of the observer and corresponding to a center of the virtual image is set as a reference beam, the first lens is inclined with respect to the reference beam.

In this manner, the projection optical system includes the first lens configured to condense light and the first optical element configured to diffuse light disposed in the order along the optical path from the display device, and the first lens is inclined with respect to the reference beam. Even in a case where outside light enters the projection optical system, this configuration inhibits stray light caused by outside light reflected by the first lens or the like. In the projection optical system, the first lens having positive power is disposed ahead of the first optical element having negative power and configured to form the intermediate image in the order along the optical path from the display device to achieve telephoto arrangement. This accordingly leads to reduction in entire length of the relay optical system and reduction in size of the first lens itself for reduction in size of the head-up display.

(2) In the head-up display according to (1), the first optical element is a mirror. This enables formation of the intermediate image by sufficiently enlarging the image displayed by the small display device, and projection by further enlarging the intermediate image for the observer.

(3) In the head-up display according to (1) or (2), the first lens has at least one free-form surface. This achieves inhibition of outside light reflection and preferred optical properties in an image optical system like a head-up display.

(4) In the head-up display according to any one of (1) to (3), the first lens has a wedge shape. Even when the first lens is inclined with respect to a reference beam, a beam passing the first lens can thus be adjusted in terms of optical path length.

(5) In the head-up display according to (4), the projection optical system includes a second optical element configured to condense light, and a second lens configured to condense light. The second lens, the second optical element, and the first lens are disposed in the order along the optical path from the display device. The second lens has a wedge shape. The second lens has at least one free-form surface. The first lens and the second lens are disposed such that a beam passing a thin portion of the first lens passes a thick portion of the second lens and a beam passing a thick portion of the first lens passes a thin portion of the second lens. Even when the first lens and the second lens are inclined with respect to the reference beam, a beam passing the first lens and the second lens can be uniformized in terms of optical path length.

(6) In the head-up display according to (5), the first lens and the second lens are formed integrally with each other. This configuration achieves reduction in a number of components and reduction in production cost for the head-up display.

(7) In the head-up display according to (5), the projection optical system includes a lens having negative refractive power, disposed ahead of the first lens on the optical path from the second optical element to the first optical element, and inclined with respect to the reference beam. This configuration reduces an aberration correction load of the optical elements to achieve higher resolution.

(8) In the head-up display according to (5), the projection optical system includes a lens having negative refractive power, disposed behind the intermediate image on the optical path from the first optical element to the virtual image, and inclined with respect to the reference beam. This configuration reduces an aberration correction load of the optical elements to achieve higher resolution.

(9) In the head-up display according to any one of (1) to (8), the intermediate image is an aerial image formed in a space on the optical path. This enables formation of the intermediate image by enlarging the image displayed by the small display device and projection by further enlarging the intermediate image for the observer, without adding any member configured to form the intermediate image.

INDUSTRIAL APPLICABILITY

The present disclosure is applicable to a head-up display including a dioptric system such as a lens. The present disclosure is specifically applicable to a head-up display mounted on a vehicle or the like.

REFERENCE MARKS IN THE DRAWINGS 100 head-up display
110 display device
120 relay optical system
121 second lens
122 first mirror
123 first lens
124 second mirror
125 third mirror
126 third lens
127 fourth lens
128 fifth lens
129 sixth lens
130 projection optical system
140 projection optical system
150 seventh lens
200 vehicle
210 dashboard
220 windshield
300 viewpoint region
D observer
I virtual image
M intermediate image
L beam
Lc reference beam

The invention claimed is:

1. A head-up display configured to project a projection image formed from an original image on a transparent reflection member to cause an observer to visually recognize a virtual image, the head-up display comprising:
  a device configured to emit beams for forming the projection image from the original image; and
  a projection optical system configured to form the projection image from the original image and project the projection image as the virtual image for the observer,
  wherein the projection optical system includes:
    a first lens configured to have a refracting surface on which the beams emitted from the device are incident;
    a fifth lens that has negative refractive power, the fifth lens having a concave surface facing the first lens;
    a second mirror configured to reflect the beams; and
    a third mirror configured to reflect the beams reflected by the second mirror to the transparent reflection member as the projection image, and
  the fifth lens, the first lens, the second mirror, and the third mirror are disposed in this order along an optical path to the transparent reflection member.

2. The head-up display according to claim 1, wherein
the concave surface of the fifth lens has a concave shape in a first axis direction and a free-form surface shape, and
a curvature of the concave surface in a second axis direction that is perpendicular to the first axis direction is less than a curvature of the concave surface in the first axis direction.

3. The head-up display according to claim 1, wherein
the concave surface of the fifth lens faces the first lens in the optical path, and
the fifth lens has a planar surface opposite to the concave surface.

4. The head-up display according to claim 1, wherein
the fifth lens is inclined with respect to a reference beam, the reference beam being defined as a beam reaching a center of a viewpoint region of the observer and corresponding to a center of the virtual image.

5. The head-up display according to claim 4, wherein
the fifth lens is inclined so that an upper side of the fifth lens is closer to the second mirror than a lower side of the fifth lens is.

6. The head-up display according to claim 1, wherein
the first lens is inclined with respect to a reference beam, the reference beam being defined as a beam reaching a center of a viewpoint region of the observer and corresponding to a center of the virtual image.

7. The head-up display according to claim 6, wherein
the projection optical system is configured to form an intermediate image from the original image by the beams emitted from the device and form the projection image from the intermediate image.

8. The head-up display according to claim 6, wherein
the optical path between the second mirror and the third mirror is a space, and
the intermediate image is an aerial image formed in the space on the optical path between the second mirror and the third mirror.

9. The head-up display according to claim 8, wherein the intermediate image is formed at a position nearer to the second mirror than to the third mirror.

10. The head-up display according to claim 1, wherein
the first lens is inclined with respect to the reference beam so that an upper side of the first lens is closer to the second mirror than a lower side of the first lens is.

11. The head-up display according to claim 10, wherein
the first lens is inclined with respect to a plane perpendicular to the reference beam at an angle from 15 degrees to 30 degrees.

12. The head-up display according to claim 1, wherein the third mirror is a concave mirror.

13. The head-up display according to claim 12, wherein the third mirror has a free-form surface.

* * * * *